(12) United States Patent
Yang et al.

(10) Patent No.: US 9,524,449 B2
(45) Date of Patent: Dec. 20, 2016

(54) GENERATION OF VISUAL PATTERN CLASSES FOR VISUAL PATTERN RECOGNITION

(71) Applicant: Adobe Systems Incorporated, San Jose, CA (US)

(72) Inventors: Jianchao Yang, San Jose, CA (US); Guang Chen, Columbia, MO (US); Hailin Jin, San Jose, CA (US); Jonathan Brandt, Santa Cruz, CA (US); Elya Shechtman, Seattle, WA (US); Aseem Omprakash Agarwala, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 146 days.

(21) Appl. No.: 14/107,191

(22) Filed: Dec. 16, 2013

(65) Prior Publication Data
US 2015/0170000 A1    Jun. 18, 2015

(51) Int. Cl.
*G06K 9/62* (2006.01)
*G06K 9/68* (2006.01)

(52) U.S. Cl.
CPC ........... *G06K 9/6267* (2013.01); *G06K 9/6807* (2013.01)

(58) Field of Classification Search
None
See application file for complete search history.

(56) References Cited

PUBLICATIONS

Linda Shapiro and George Stockman, "Computer Vision", 2000.*
Shapiro and Stockman, Computer Vision, Prentice Hall 2000: Chapter 14.*

* cited by examiner

*Primary Examiner* — Mark Roz
(74) *Attorney, Agent, or Firm* — Shook, Hardy & Bacon, L.L.P.

(57) ABSTRACT

Example systems and methods for classifying visual patterns into a plurality of classes are presented. Using reference visual patterns of known classification, at least one image or visual pattern classifier is generated, which is then employed to classify a plurality of candidate visual patterns of unknown classification. The classification scheme employed may be hierarchical or nonhierarchical. The types of visual patterns may be fonts, human faces, or any other type of visual patterns or images subject to classification.

8 Claims, 27 Drawing Sheets

Based on its assignment to Aux Node 419, Font 6 is reassigned to Node 420 using the classifier for subdividing Node 400. Font 6 may also remain in Aux Node 419.

Example of Hard-Splitting into Mutually
Exclusive Classes (e.g., Nodes)

Example of Misclassification of Font 3

Example of Soft-Assignment into Mutually Non-Exclusive Classes (e.g., Nodes)

Font 6 is erroneously assigned to Node 410, but is assigned to child Aux. Node 419.

US 9,524,449 B2

GENERATION OF VISUAL PATTERN CLASSES FOR VISUAL PATTERN RECOGNITION

TECHNICAL FIELD

The subject matter disclosed herein generally relates to data processing. More specifically, the present disclosure addresses systems and methods of generating visual pattern classes for recognition of visual patterns.

BACKGROUND

A visual pattern may be depicted in an image. An example of a visual pattern is text, such as dark words against a white background or vice versa. Moreover, text may be rendered in a particular typeface or font (e.g., Times New Roman or Helvetica) and in a particular style (e.g., regular, semi-bold, bold, black, italic, or any suitable combination thereof). Another example of a visual pattern that may be depicted in an image is an object, such as a car, a building, or a flower. A further example of a visual pattern is a face (e.g., a face of a human or animal). A face depicted in an image may be recognizable as a particular individual. Furthermore, the face within an image may have a particular facial expression, indicate a particular gender, indicate a particular age, or any suitable combination thereof. Another example of a visual pattern is a scene (e.g., a landscape or a sunset). A visual pattern may exhibit coarse-grained features (e.g., an overall shape of alphabetic letter rendered in a font), fine-grained features (e.g., a detailed shape of an ending of the letter that is rendered in the font), or any suitable combination thereof.

As the number of different types of fonts, objects, faces, scenes, or other visual patterns that may be recognized or classified increase, the ability to recognize or classify a particular visual pattern may become more difficult and time-consuming.

BRIEF DESCRIPTION OF THE DRAWINGS

Some embodiments are illustrated by way of example and not limitation in the figures of the accompanying drawings.

DETAILED DESCRIPTION

Figure 1:
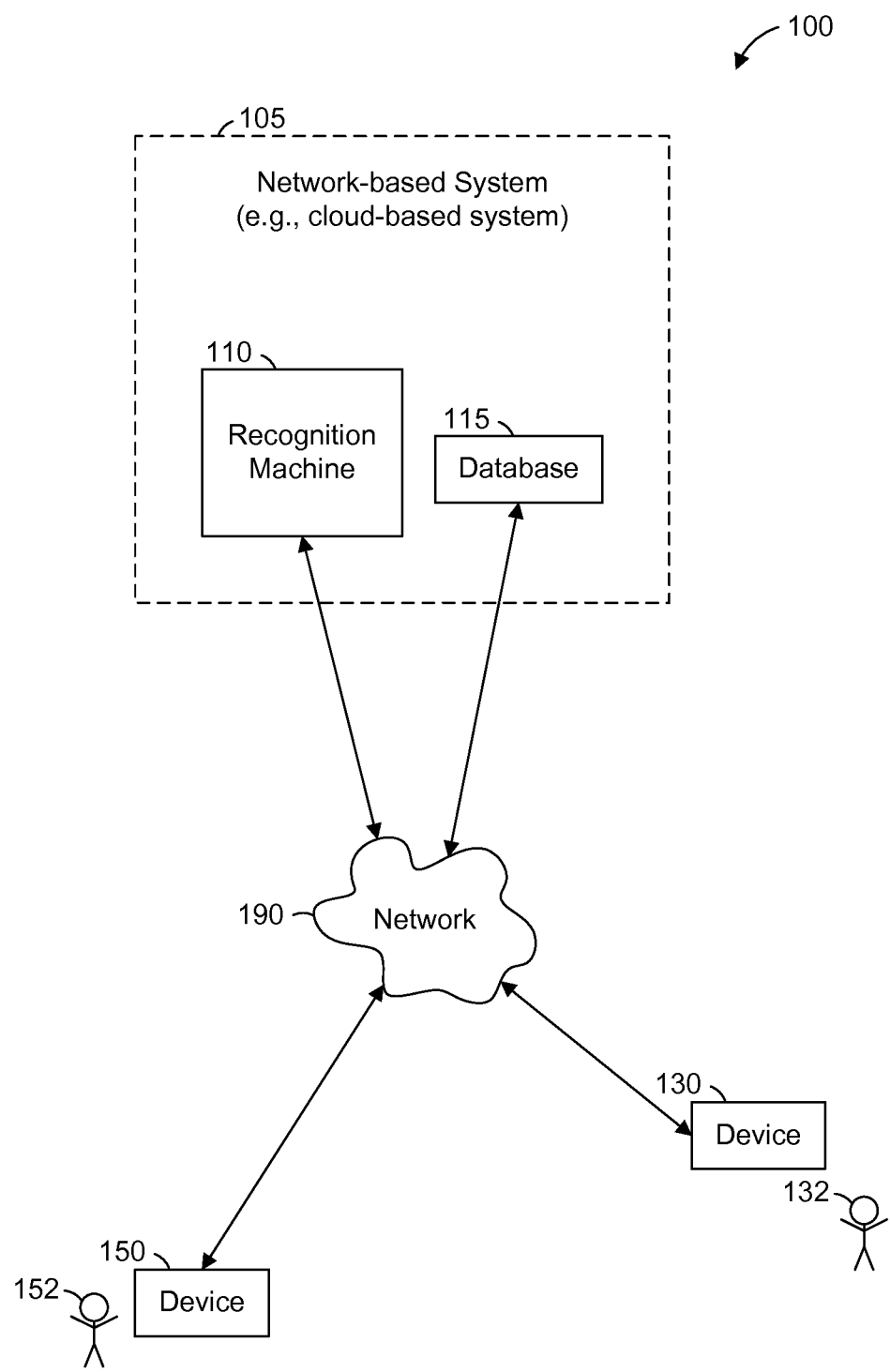
FIG. 1 is a network diagram illustrating a network environment suitable for visual pattern classification and recognition, according to some example embodiments.

Example methods and systems are directed to generating visual pattern classes for recognizing, categorizing, identifying, and/or classifying visual patterns appearing in one or more images. Such classes may be hierarchical (e.g., a tree of classifications, categories, or clusters of visual patterns) or nonhierarchical. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details. For example, a class of visual patterns may include a class of fonts (e.g., a classification, category, or group of typefaces or fonts used for rendering text in images). In some situations, an individual font may be treated as an individual visual pattern (e.g., encompassing multiple images of letters and numerals rendered in the single font), while groups (e.g., families or categories) of related fonts may be treated as larger classes of visual patterns (e.g., regular, bold, italic, and italic-bold versions of the same font). Other example forms of visual patterns may be supported, such as face types (e.g., classified by expression, gender, age, or any suitable combination thereof), objects (e.g., arranged into a hierarchy of object types or categories), and scenes (e.g., organized into a hierarchy of scene types or categories).

A system (e.g., a visual pattern classification and recognition system) may be or include a machine (e.g., an image processing machine) that analyzes images of visual patterns (e.g., analyzes visual patterns depicted in images). To do this, the machine may generate a representation of various features of an image. Such representations of images may be or include mathematical representations (e.g., feature vectors) that the system can analyze, compare, or otherwise process, to classify, categorize, or identify visual patterns depicted in the represented images. In some situations, the system may be or include a recognition machine configured to use one or more machine-learning techniques to train one or more classifiers (e.g., classifier modules) for visual patterns. For example, the recognition machine may use the classifier to classify one or more reference images (e.g., test images) whose depicted visual patterns are known (e.g., predetermined), and then modify or update the classifier (e.g., by applying one or more weight vectors, which may be stored as templates of the classifier) to improve its performance (e.g., speed, accuracy, or both).

As discussed herein, the system may utilize an image feature representation called local feature embedding (LFE). LFE enables generation of a feature vector that captures salient visual properties of an image to address both the fine-grained aspects and the coarse-grained aspects of recognizing a visual pattern depicted in the image. Configured to utilize image feature vectors with LFE, the system may implement a nearest class mean (NCM) classifier, as well as a scalable recognition algorithm with metric learning and max-margin template selection. Accordingly, the system may be updated to accommodate new classes with very little added computational cost. This may have the effect of enabling the system to readily handle open-ended image classification problems. LFE is discussed in greater detail below.

The recognition machine may utilize or employ LFE to produce a nonhierarchical, or "flat," multi-class classification scheme, in which each visual pattern class is treated substantially equally. In other implementations, the recognition machine may be configured as a clustering machine that utilizes LFE to organize (e.g., cluster) visual patterns into nodes (e.g., clusters) or classes that each represent one or more visual patterns (e.g., by clustering visual patterns into groups that are similar to each other). These nodes may be arranged as a hierarchy (e.g., a tree of nodes, or a tree of clusters) in which a node may have a parent-child relationship with another node. For example, a root node may represent all classes of visual patterns supported by the system, and nodes that are children of the root node may represent subclasses of the visual patterns. Similarly, a node that represents a subclass of visual patterns may have child nodes of its own, where these child nodes each represent a sub-subclass of visual patterns. A node that represents only a single visual pattern cannot be subdivided further and is therefore a leaf node in the hierarchy.

Several possible enhancements for generating hierarchical and nonhierarchical pattern classes may be employed to facilitate efficient and accurate visual pattern recognition. For example, the recognition machine may implement auxiliary nodes in hierarchical visual pattern classes, as described in greater detail below, to limit propagation of erroneous visual pattern classifications. Additionally, the recognition machine may implement a node-splitting and tree-learning algorithm that includes (1) hard-splitting of nodes into mutually exclusive nodes or classes, and (2) soft-assignment of nodes to non-mutually-exclusive nodes or classes to perform error-bounded splitting of nodes into clusters. Such enhancements may enable the overall system to perform large-scale visual pattern recognition (e.g., font recognition) while limiting error propagation in visual pattern classes (e.g., fonts or font classes).

For the sake of clarity, visual patterns may be discussed herein in the context of an example form of fonts (e.g., typefaces), although any other type of visual pattern subject to classification and/or recognition, such as those mentioned above, may be processed in a manner at least similar to the embodiments presented herein. Some fonts may share many features with each other. For example, a group of fonts may belong to the same family of typefaces, in which each member of the family differs from the others by only small variations (e.g., aspect ratio of characters, stroke width, or ending slope). When differences between fonts are subtle, classifying or identifying these fonts is different from classifying fonts that share very few features (e.g., fonts from different or divergent families). To address such situations, the system (e.g., the recognition machine) may employ a hierarchical classification scheme to cluster the fonts, so that fonts within each cluster are similar to each other but vary dramatically from fonts in other clusters. Each cluster of fonts may then have a specific classifier (e.g., an image classifier module) trained for that cluster of fonts, and the system may be configured to train and use multiple classifiers for multiple clusters of fonts. By organizing clusters of fonts into a hierarchical classification scheme, and implementing a specific classifier for each cluster of fonts, the system may perform visual font recognition with increased speed compared to existing algorithms. In some examples, each node may employ a node-specific or class-specific "codebook," as described in greater detail below, to enhance the ability of the classifier to distinguish between various fonts of a particular node more effectively and efficiently.

In some additional examples, the recognition machine, in utilizing LFE for feature vector generation, may employ two or more different local feature types to further enhance visual pattern class generation and recognition. As described more fully below, multiple local feature types may be combined in a number of ways to provide a feature vector or representation for an image that represents multiple characteristics of the image that are useful for classifying that image. By employing multiple local feature types, the resulting classification or recognition process may be more accurate and/or precise.

FIG. 1 is a network diagram illustrating a network environment 100, according to some example embodiments. The network environment 100 includes a recognition machine 110, a database 115, and devices 130 and 150, all communicatively coupled to each other via a network 190. The recognition machine 110, the database 115, and the devices 130 and 150 may each be implemented in a computer system, in whole or in part, as described below with respect to FIG. 27.

The recognition machine 110 may be configured (e.g., by one or more software modules, as described below with respect to FIG. 2) to perform one or more of any of the methodologies discussed herein, in whole or in part. Such methodologies include nonhierarchical and hierarchical class generation algorithms (e.g., as discussed below with respect to FIG. 3-16). Such methodologies may further include image processing algorithms (e.g., visual pattern recognition algorithms) that may be used by the recognition machine 110 to train an image classifier, use an image classifier to classify (e.g., recognize, categorize, or identify) an image, or both. The database 115 may store one or more images before, during, or after image processing by the recognition machine 110. Accordingly, the database 115 may store a reference set (e.g., trainer set) of images (e.g., a training database of images for training an image classifier), a set of unclassified images (e.g., a test database of test images, or a production database of captured images) to be processed by the recognition machine 110, or any suitable combination thereof. Moreover, the recognition machine 110, with or without the database 115, may form all or part of a network-based system 105. The network-based system 105 may be or include a cloud-based image processing system (e.g., visual pattern recognition system) that provides one or more network-based image processing services (e.g., a visual pattern recognition service). For example, an image may be received by the recognition machine 110 from the device 130, and the recognition machine 110 may perform image processing operations on the image to classify the image according to one or more visual patterns recognized within the image.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a laptop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a laptop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 27. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the recognition machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
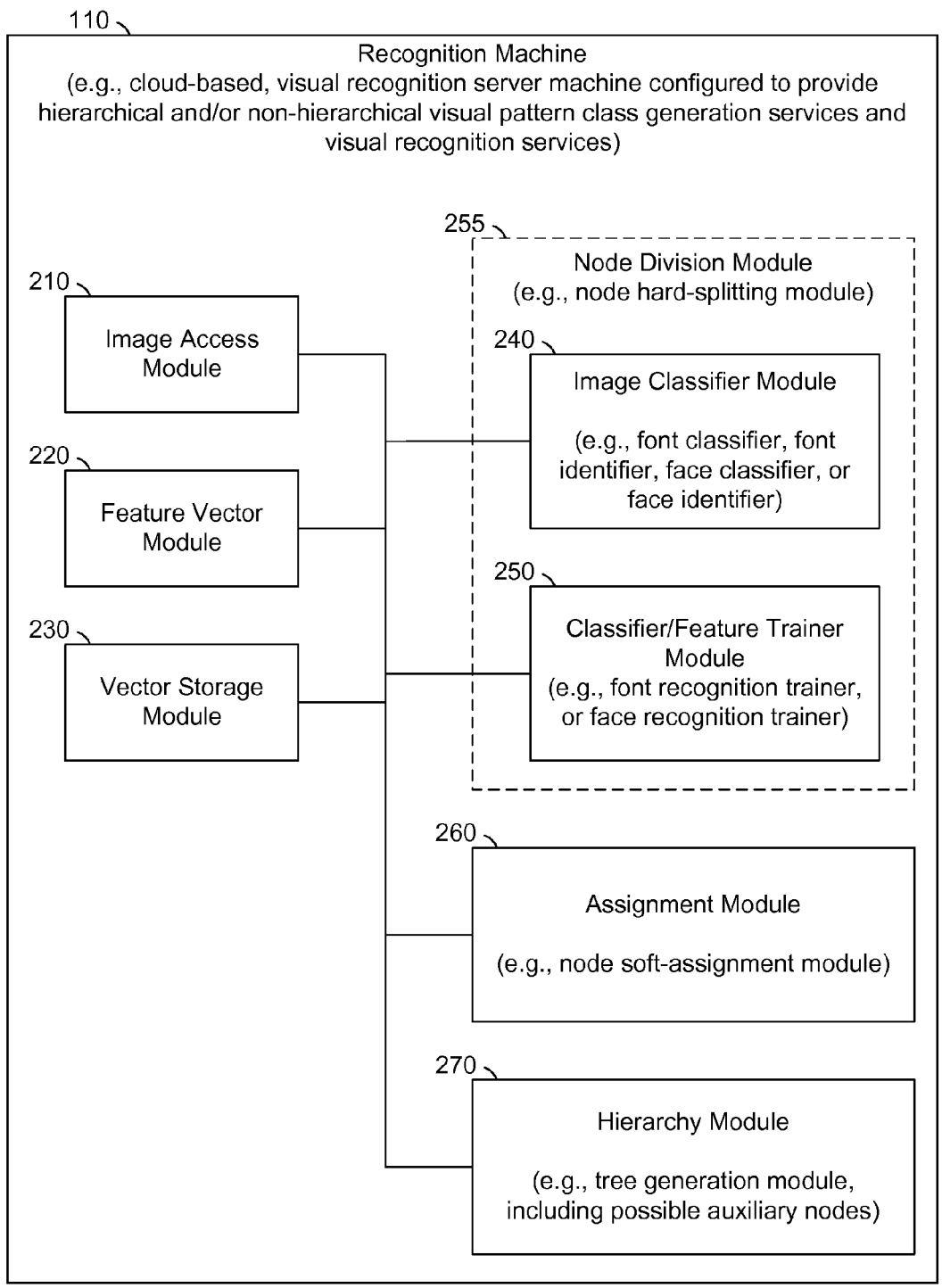
FIG. 2 is a block diagram illustrating components of a recognition machine suitable for generating hierarchical and/or nonhierarchical visual pattern classes, according to some example embodiments.

FIG. 2 is a block diagram illustrating components of the recognition machine 110, according to some example embodiments. The recognition machine 110 may be a cloud-based server machine (e.g., a hierarchical and/or nonhierarchical visual pattern class generation machine, a visual recognition server machine, or any suitable combination thereof) and is shown as including an assignment module 260 (e.g., a node soft-assignment module) and a hierarchy module 270 (e.g., a tree generation module), which may be configured to communicate with each other (e.g., via a bus, shared memory, or a switch). The assignment module 260 may be configured to begin with mutually exclusive child classes that have been split from a parent class, and then remove mutual exclusivity from two or more child classes by adding a visual pattern (e.g., a font, font family, or a category of fonts) to one or more of the child classes, such that multiple child classes each include the visual pattern. The hierarchy module 270 may be configured to generate a hierarchy of classes of visual patterns (e.g., visual pattern classes), or, alternatively, a visual pattern classification hierarchy, based on the output of the assignment module 260. For example, the hierarchy module 270 may generate the hierarchy such that the hierarchy includes the parent class and the mutually nonexclusive child classes (e.g., the child classes from which mutual exclusivity was removed) that each includes the visual pattern or subclass of visual patterns. In some examples, the hierarchy module 270 may include auxiliary nodes in the hierarchy to limit and/or correct misclassification of visual patterns. Further details of the assignment module 260 and the hierarchy module 270 are discussed below.

According to various example embodiments, the recognition machine 110 may also include an image access module 210, a feature vector module 220, and a vector storage module 230, which may all be configured to communicate with any one or more other modules of the recognition machine 110 (e.g., via a bus, shared memory, or a switch). As shown, the recognition machine 110 may further include an image classifier module 240, a classifier trainer module 250, or both. The image classifier module 240 may be or include a font classifier (e.g., typeface classifier), a font identifier (e.g., typeface identifier), a face classifier (e.g., facial expression classifier, facial gender classifier, or both), face identifier (e.g., face recognizer), an identifier or classifier for any other type of visual pattern subject to recognition or classification, or any suitable combination thereof. The classifier trainer module 250 may be or include a font recognition trainer (e.g., typeface recognition trainer), a face recognition trainer, or any suitable combination thereof. As shown in FIG. 2, the image classifier module 240 and the classifier trainer module 250 may be configured to communicate with each other, as well as with the image access module 210, the feature vector module 220, and a vector storage module 230. The image classifier module 240, the classifier trainer module 250, or both, may form all or part of a node division module 255 (e.g., a module configured to perform hard-splitting of nodes for hierarchical classification schemes).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
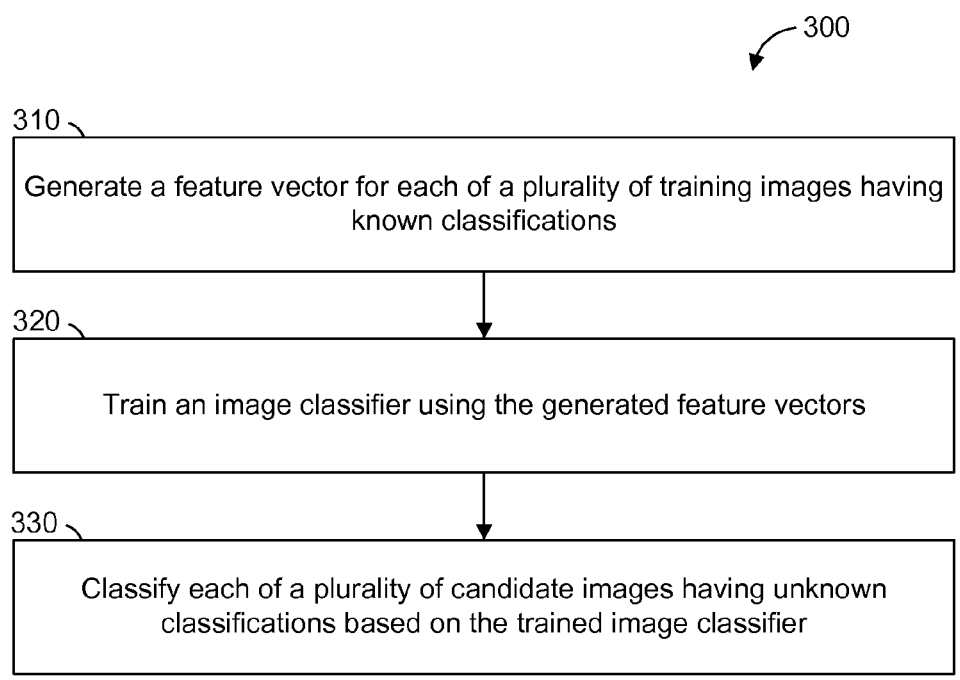
FIG. 3 is a flowchart illustrating operations of the recognition machine in performing a method of generating nonhierarchical visual pattern classes, according to some embodiments.

FIG. 3 is a flowchart illustrating operations of the recognition machine 110 in performing a method 300 of generating nonhierarchical visual pattern classes, according to some embodiments. In the method 300, a feature vector or other representation is generated for each of a plurality of training images having known classifications (operation 310). An image classifier may then be trained using the generated feature vectors (operation 320). Each of a plurality of candidate or test images having unknown classifications may be classified based on the trained image classifier (operation 330).

While the operations 310-330 of the method 300 are presented in a particular order in FIG. 3, other potential orders of the execution of the operations 310-330, including partial or complete overlap of at least some of the operations 310-330, or repetitive execution of at least some of the operations 310-330, are also possible. Other methods presented and explained below may operate in a similar manner.

Figure 4:
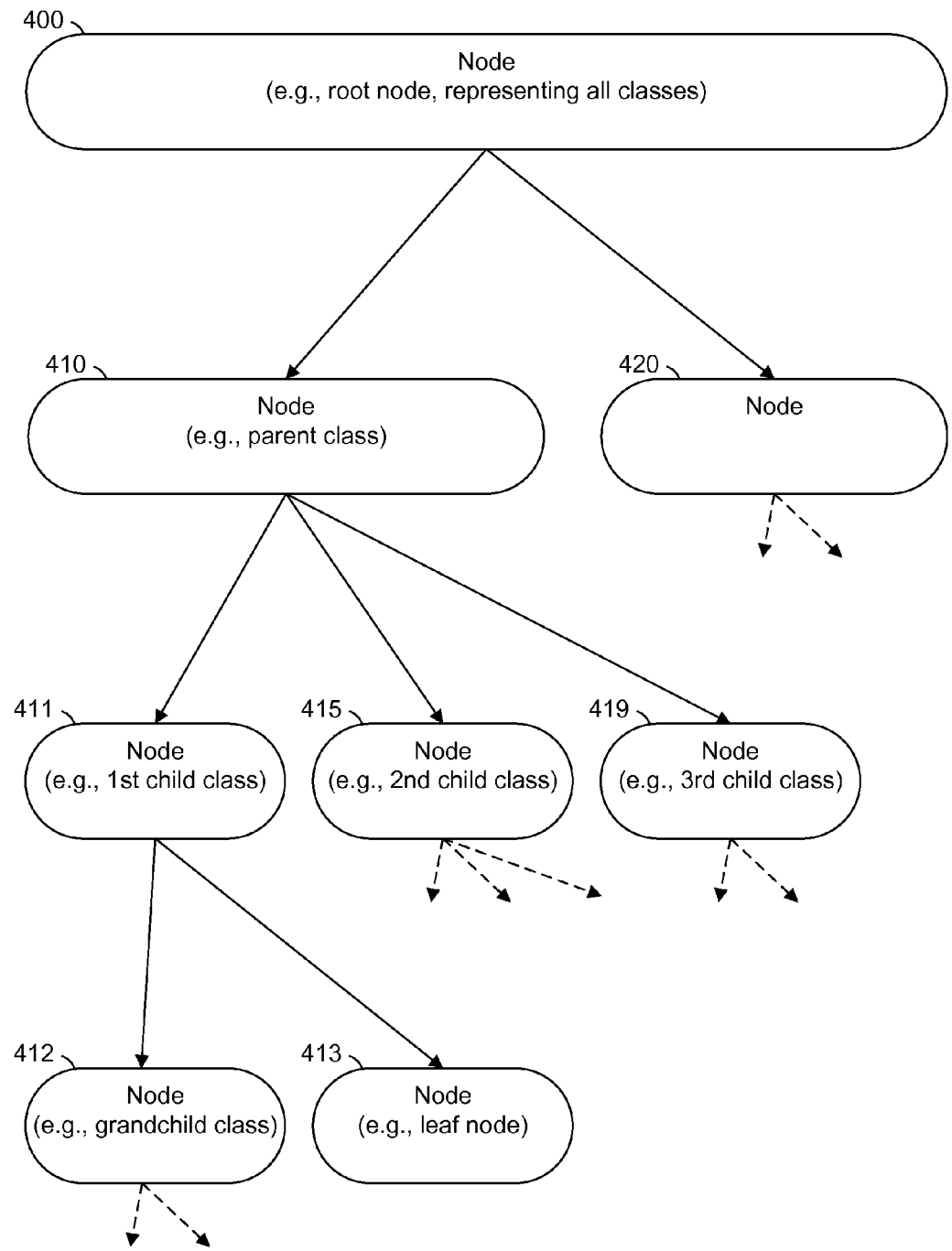
FIG. 4 is a conceptual diagram illustrating a hierarchy of visual pattern classes, according to some example embodiments.

FIG. 4 is a conceptual diagram illustrating a hierarchy of nodes representing visual pattern classes, or a visual pattern classification hierarchy, according to some example embodiments. The hierarchy includes a node 400 that may be a root node representing all classes of visual patterns that are supported by (e.g., represented within) the hierarchy. These classes may be subdivided into multiple subclasses and sub-subclasses, which may be represented by additional nodes of the hierarchy. As shown in FIG. 4, the classes represented by node 400 may be subdivided among two nodes 410 and 420, with the node 410 representing a portion of the classes represented by the node 400, and the node 420 representing another portion of classes that are represented by the node 400. In general, the nodes 410 and 420 may be mutually exclusive and have nothing in common (e.g., no classes or visual patterns in common). Alternatively, the nodes 410 and 420 may be mutually nonexclusive and include at least one class or visual pattern in common. The node 400 may be considered as a parent of the node 410 and 420, which may be considered children of the node 400.

In a similar manner, the classes represented by the node 410 may be subdivided among multiple nodes 411, 415, and 419, with each of the nodes 411, 415, and 419 strictly or approximately representing a different portion of the classes that are represented by the node 410. For example, the nodes 411, 415, and 419 may be mutually exclusive and have nothing in common. Alternatively, two or more of the nodes 411, 415, and 419 may lack mutual exclusivity and include at least one class or visual pattern in common. The node 410 may be considered as a parent of the nodes 411, 415, 419, which may be considered children of the node 410. As indicated by dashed arrows, the node 420 may also have child nodes.

Likewise, the classes represented by the node 411 may be subdivided among multiple nodes 412 and 413, with each of the nodes 412 and 413 strictly or approximately representing a different portion of the classes that are represented by the node 411. As examples, the nodes 412 and 413 may be mutually exclusive (e.g., having no classes or visual patterns in common) or may be mutually non-exclusive (e.g., both including at least one class or visual pattern shared in common). Thus, the node 411 may be considered as a parent of the nodes 412 and 413, which may be considered as children of the node 411. As indicated by dashed arrows, one or more of the nodes 415 and 419 may have their own child nodes.

In the example shown in FIG. 4, considering the node 410 as a parent node of child nodes 411, 415, and 419, the nodes 412 and 413 may be considered as grandchild nodes of the node 410. As indicated by dashed arrows, the node 412 may have its own child nodes (e.g., great-grandchild nodes of the node 410). Moreover, the node 413 may represent only a single visual pattern (e.g., single font) or a single class of visual patterns (e.g., a single font family). Accordingly, the node 413 may be considered as a leaf node (e.g., in contrast with the root node 400) of the hierarchy (e.g., the node tree).

Figure 5:
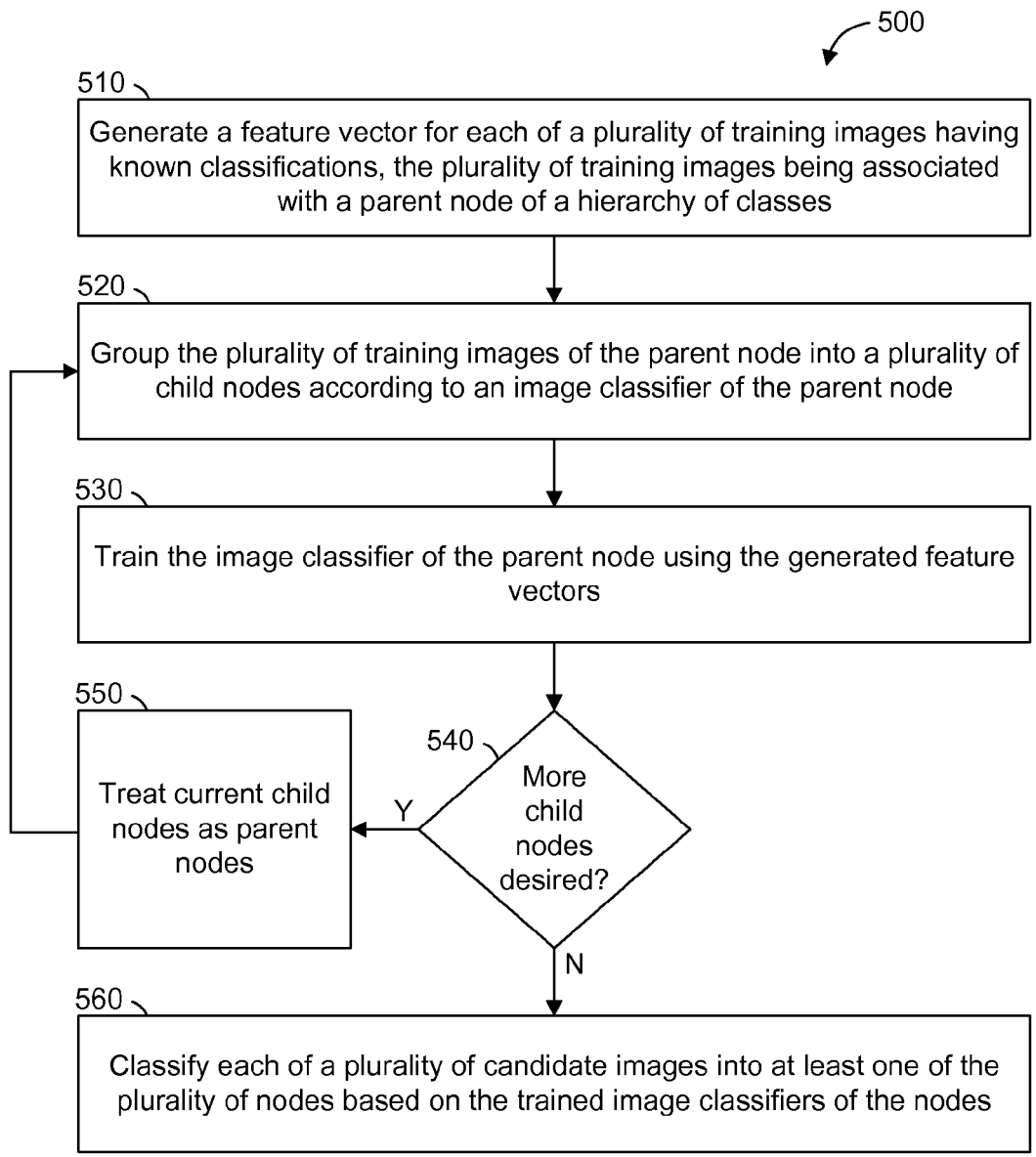
FIG. 5 is a flowchart illustrating operations of the recognition machine in performing a method of generating hierarchical visual pattern classes, according to some embodiments.

FIG. 5 is a flowchart illustrating operations of the recognition machine 110 in performing a method 500 of generating hierarchical visual pattern classes, according to some embodiments. In the method 500, a feature vector or other representation may be generated for each of a plurality of training images having known classifications (operation 510). The plurality of training images may be associated with a parent node (e.g., node 400 of FIG. 4) of a hierarchy of classes. The plurality of training images of the parent node may be grouped in a plurality of child nodes (e.g., nodes 410 and 420 of FIG. 4) according to an image classifier of the parent node (operation 520). The image classifier of the parent node may be trained using the generated feature vectors (operation 530). If more child nodes are desired for the hierarchy (operation 540), each of the current child nodes may be treated as parent nodes (e.g., child nodes 410 and 420 may be treated as parent nodes) (operation 550), and the grouping and training operations (operations 520 and 530) may be performed again. This process may be repeated until the image classifiers for all parent nodes have been trained. Each of a plurality of candidate images may be classified into at least one of the plurality of nodes of the hierarchy based on the trained image classifiers of the nodes (operation 560).

Figure 6:
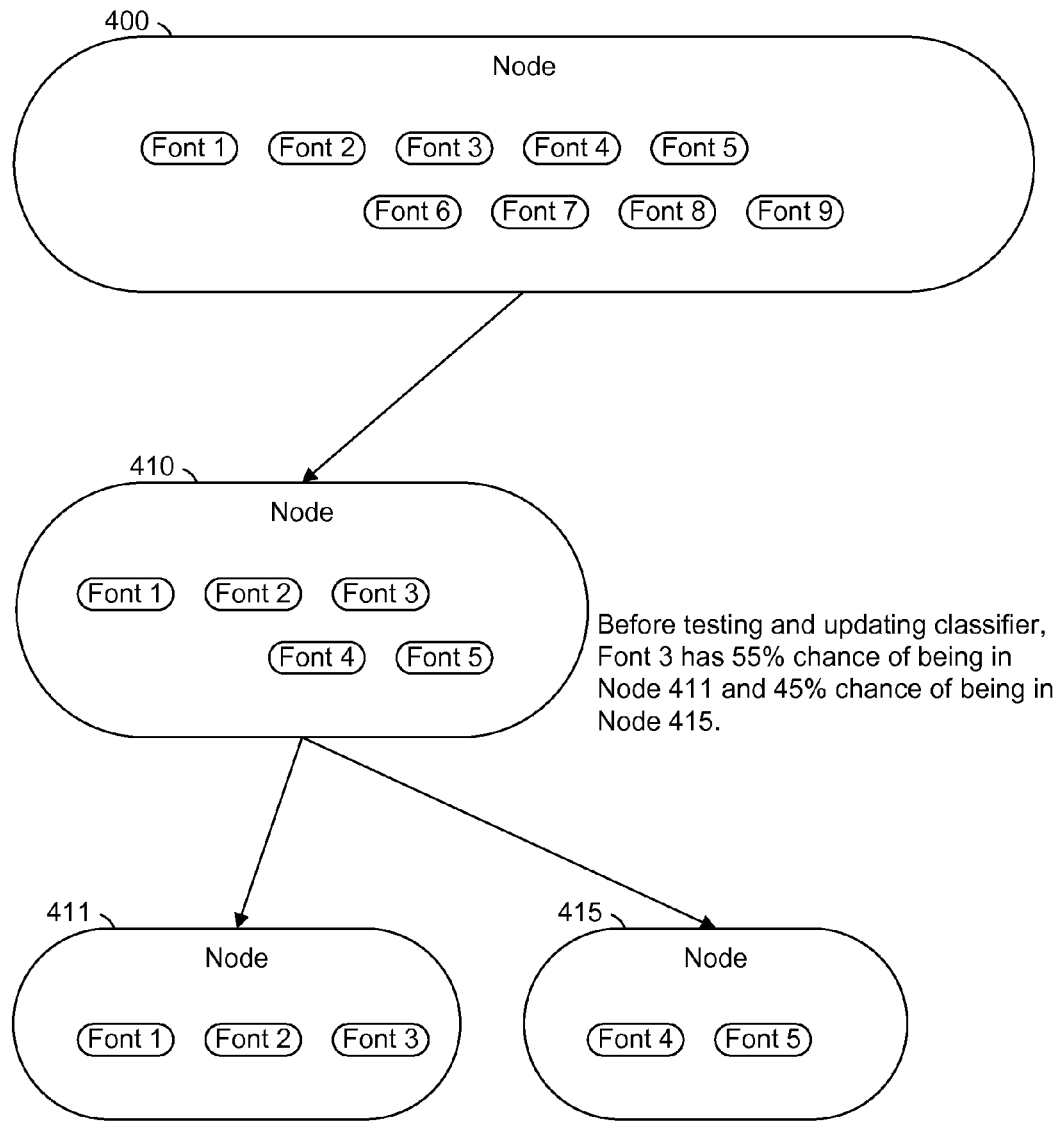
FIGS. 6-8 are conceptual diagrams illustrating a hierarchy of visual pattern classes, according to some example embodiments.
Figure 7:
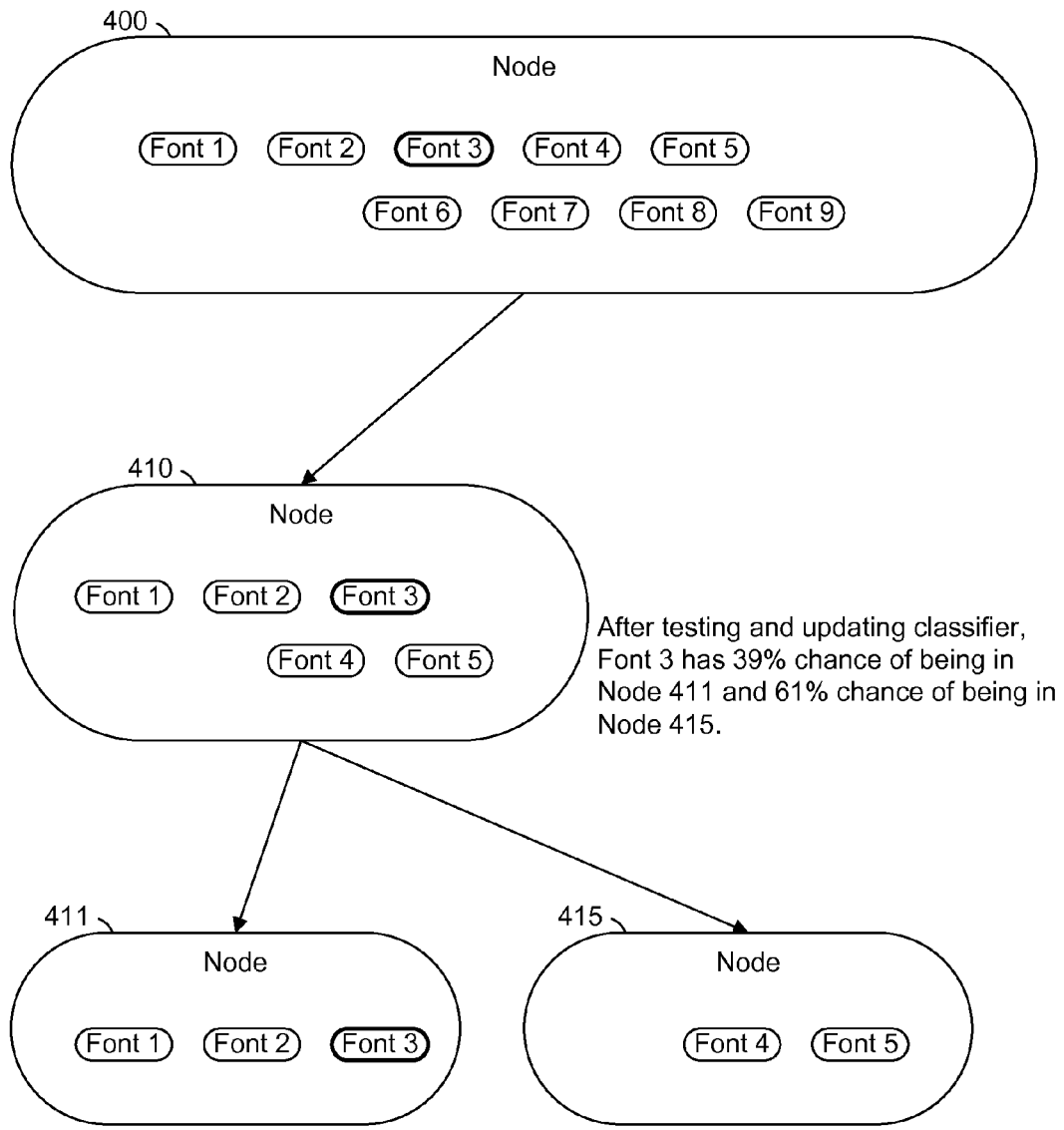
Figure 8:
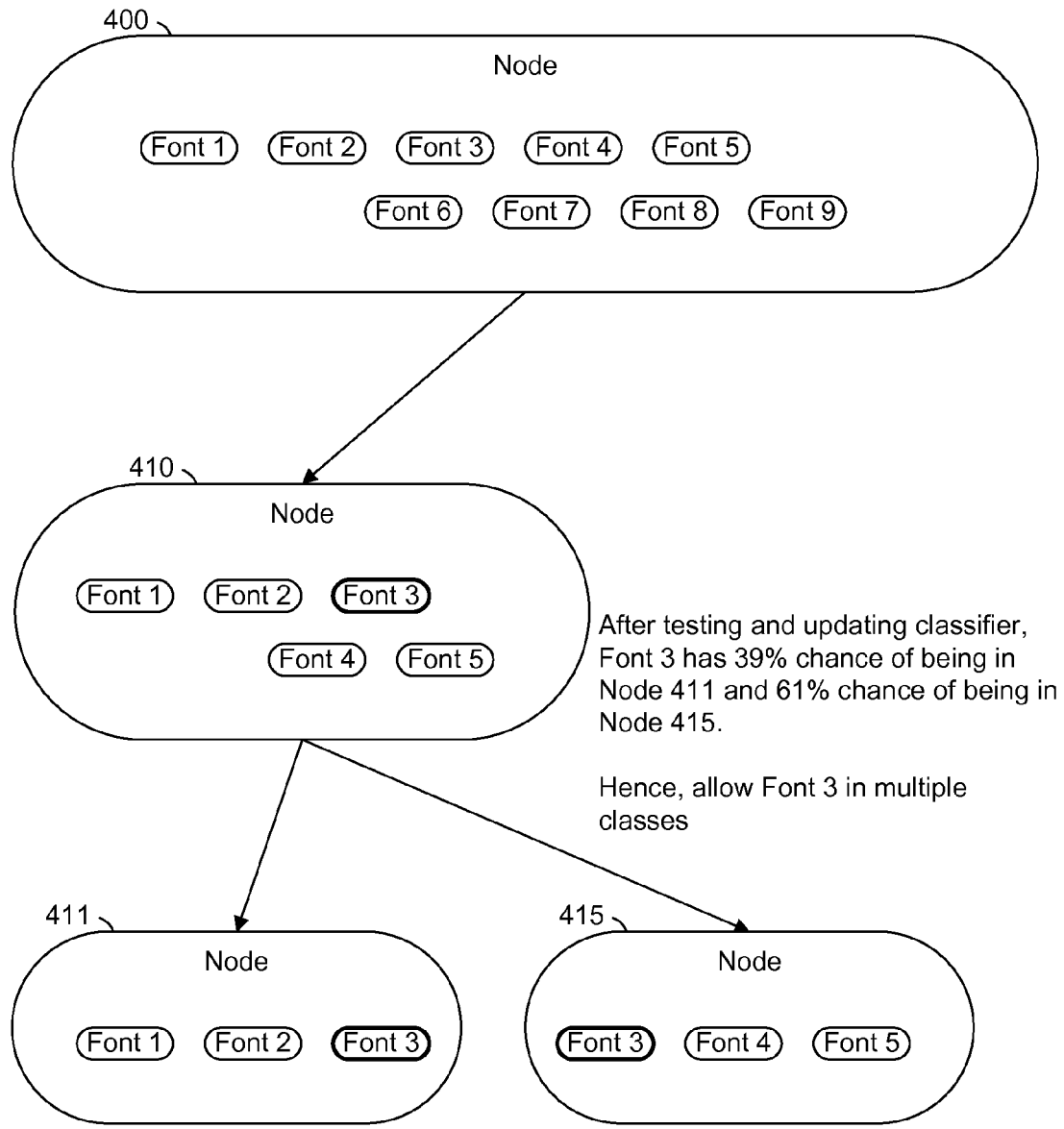

FIGS. 6-8 illustrate an example of hard-splitting a parent node (e.g., parent class) into mutually exclusive child classes (e.g., child nodes) and subsequent soft-assignment of a visual pattern (e.g., a font) into child classes from which their initial mutual exclusivity has been removed.

FIG. 6 illustrates an example of hard-splitting the node 410 into mutually exclusive nodes 411 and 415. As shown, the node 400 (e.g., root node) may be a top-level class of visual patterns, and this top-level class may encompass multiple visual patterns in the example form of fonts (e.g., Font 1, Font 2, Font 3, Font 4, Font 5, Font 6, Font 7, Font 8, and Font 9). These fonts may form all or part of a reference set of visual patterns (e.g., a test set of visual patterns with known classifications) that are usable to train one or more classifiers.

Suppose that Fonts 1-5 have been classified (e.g., by a classifier module, such as the image classifier module 240) into the node 410. Using hard-splitting, a classifier (e.g., a classifier that is specific to the node 410) may subdivide (e.g., split, cluster, or otherwise allocate into portions) the node 410 into child nodes, such as the nodes 411 and 415, which may be mutually exclusive (e.g., at least upon this initial subdividing). In the example shown, prior to testing and updating the classifier, the classifier may define a 55% chance of classifying Font 3 into the node 411 and a 45% chance of classifying Font 3 into the node 415. Such probabilities may be stored in a weight vector for the node 410, and this weight vector may be used by (e.g., incorporated into) the classifier for the node 410. Accordingly, Font 3 is shown as being classified exclusively into the node 411, with no representation whatsoever in the node 415.

However, as shown in FIG. 7, there may be some error in that Font 3 may be misclassified into the node 411, instead of the node 415. If the actual proper classification for Font 3 is known (e.g., predetermined) to be the node 415, Font 3 has been misclassified by this initial hard-splitting operation, and the classifier may be improved (e.g., modified or adjusted) such that it is more likely to classify Font 3 into the node 415. In the example shown in FIG. 7, after testing and updating the classifier (e.g., specifically configured to subdivide the node 410), the classifier may define a 39% chance of putting Font 3 in the node 411 and a 61% chance of putting Font 3 in the node 415. Such probabilities may be stored in a modified weight vector for the node 410. In this manner, the classifier can be iteratively improved to produce more accurate subdivisions for visual patterns of known classification (e.g., the reference set of visual patterns).

In this example, though, there is still a chance (e.g., 39%) that a font similar to Font 3 should be classified into the node 411, instead of the node 415. To address this possibility, soft-assignment may be used to allow Font 3 to exist in multiple nodes (e.g., mutually nonexclusive nodes or classes). This situation is shown in FIG. 8. As shown, the mutual exclusivity of the nodes 411 and 415 has been removed by adding Font 3 into the node 415, while maintaining Font 3 in the node 411, as initially allocated by the classifier.

As a result, this combination of hard-splitting and soft-assignment may produce an error-bounded hierarchy (e.g., tree) of nodes. This error-bounded hierarchy may be used to facilitate visual pattern recognition, for example, by omitting unrelated classifiers and executing only those classifiers with at least a threshold probability of actually classifying a candidate visual pattern (e.g., a font of unknown classification or identity). This benefit can be seen by reference to FIG. 8. Using the hierarchy shown, recognition of Font 1 would involve three or four executions of classifiers (e.g., one to subdivide the node 400, one to subdivide the node 410, and one or two to isolate Font 1 from Fonts 2 and 3 in the node 411). Without the hierarchy, between one and eight executions of classifiers would be used to isolate Font 1 from the other eight Fonts 1-8. With large numbers of visual patterns (e.g., thousands of fonts), the use of such an error-bounded hierarchy may be part of an efficient and scalable solution for automated visual pattern recognition.

Figure 9:
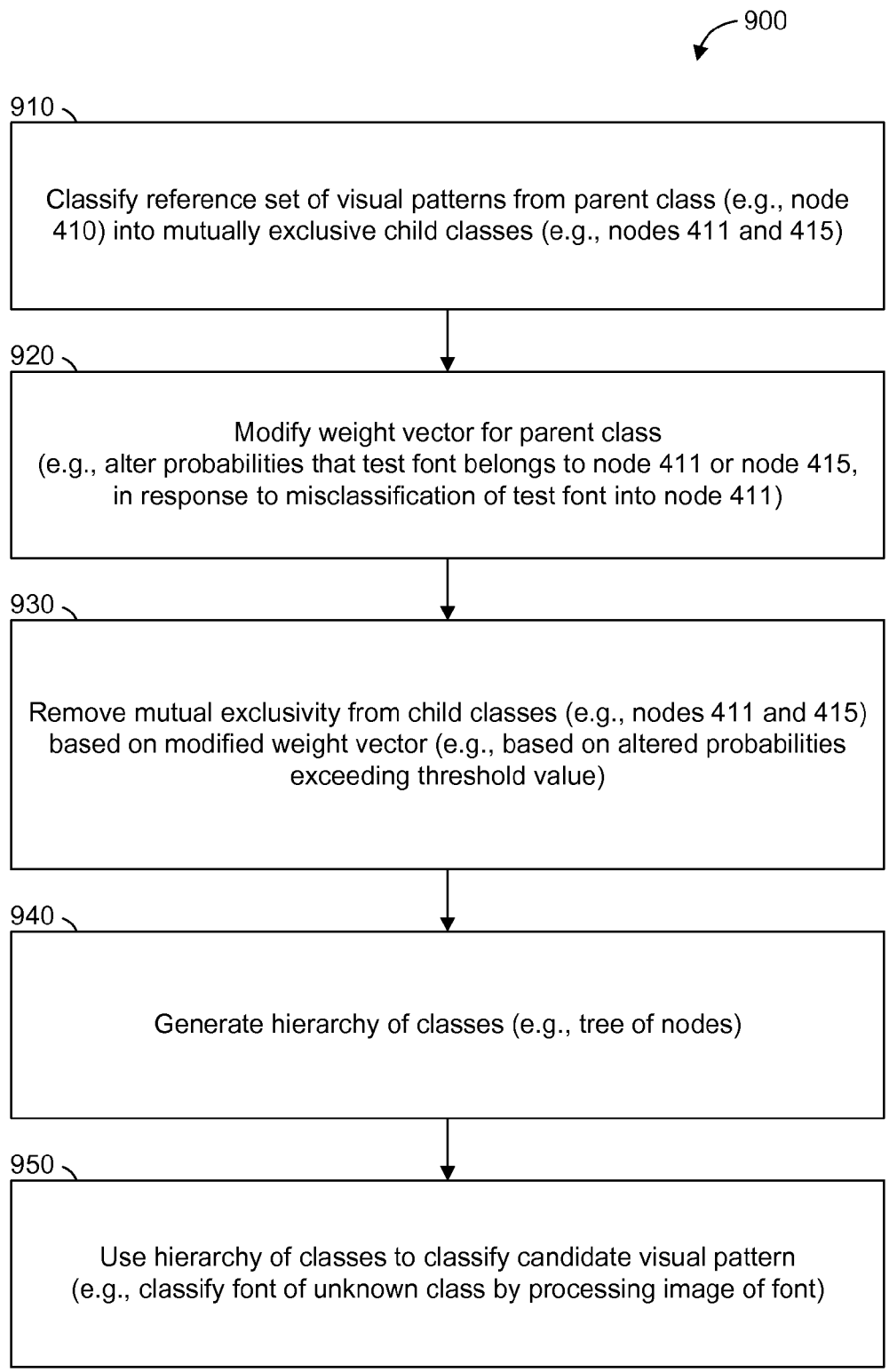
FIGS. 9-11 are flowcharts illustrating operations of the recognition machine in performing a method of generating the hierarchy of visual pattern classes, according to some example embodiments.
Figure 10:
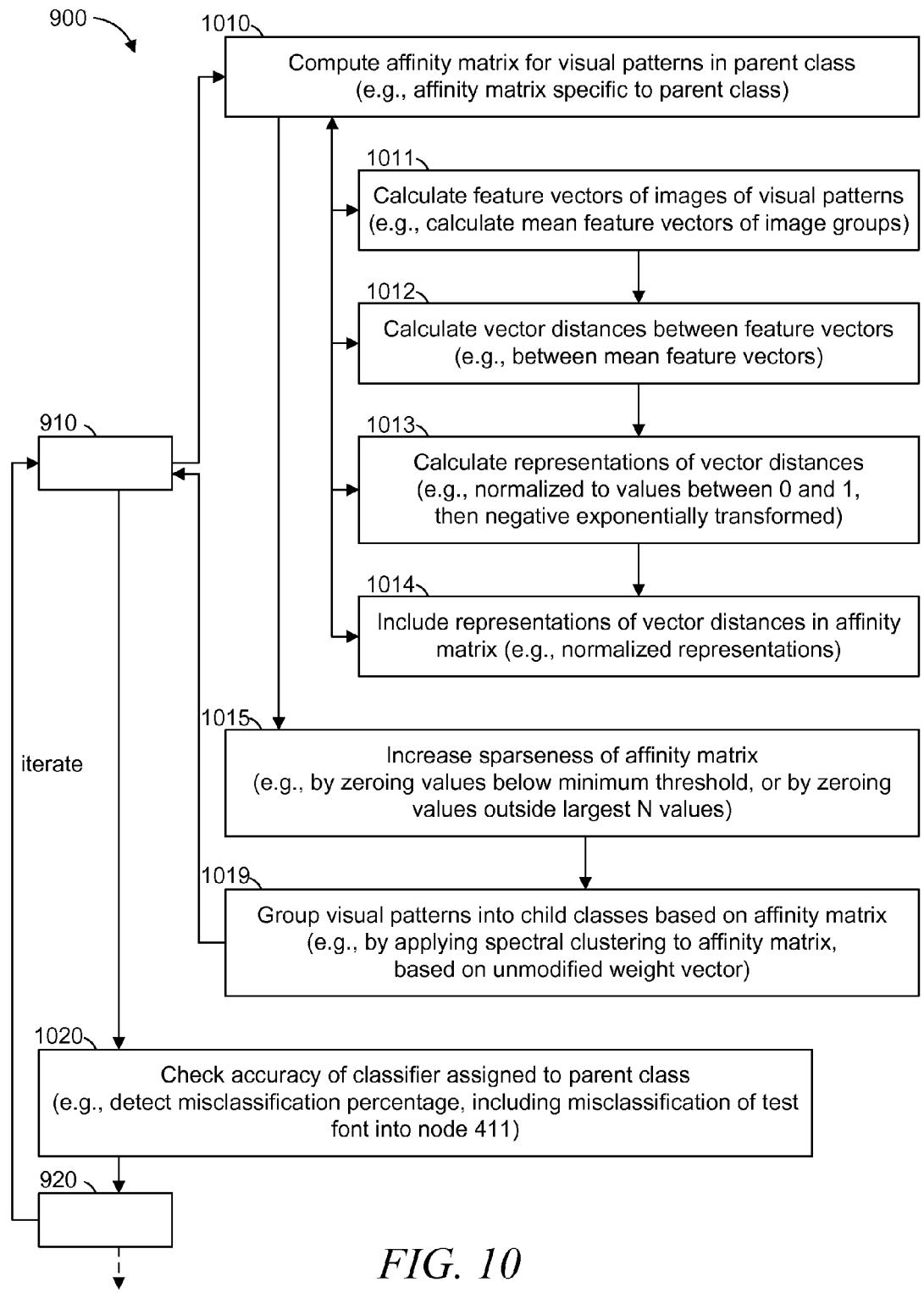
Figure 11:
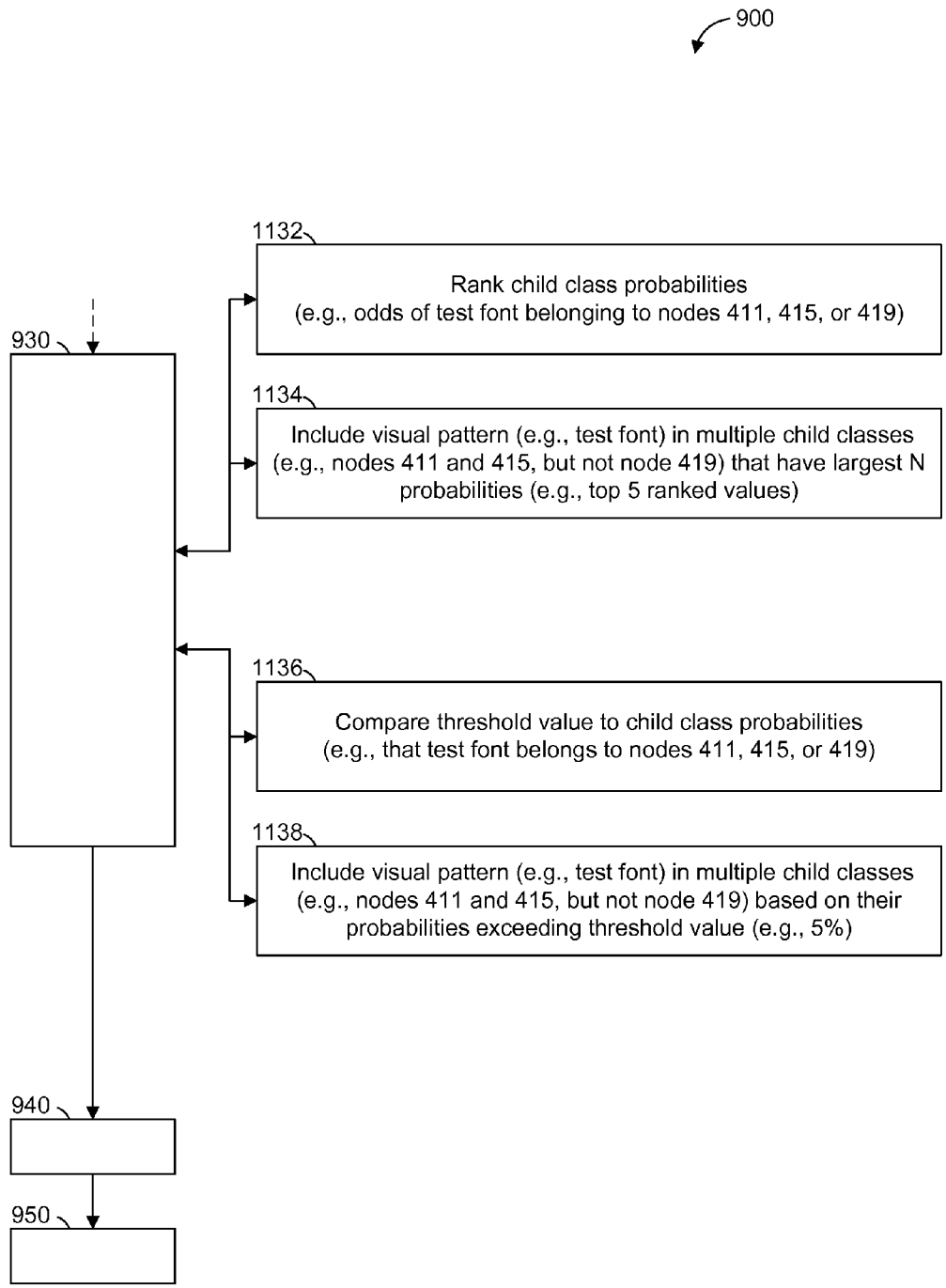

FIGS. 9-11 are flowcharts illustrating operations of the recognition machine 110 in performing a method 900 of generating the hierarchy of visual pattern classes, according to some example embodiments. Operations in the method 900 may be performed using modules described above with respect to FIG. 2. As shown in FIG. 9, the method 900 may include one or more of operations 910, 920, 930, 940, and 950.

In operation 910, the image classifier module 240 classifies a reference set of visual patterns (e.g., a test set of fonts, such as Fonts 1-9 illustrated in FIG. 6-8, which fonts may be stored in the database 115) that belong to a parent class (e.g., node 410). The image classifier module 240 may classify this reference set into mutually exclusive child classes (e.g., nodes 411 and 415, as shown in FIG. 6). For example, such mutually exclusive child classes may include a first child class (e.g., node 411) and a second child class (e.g., node 415). In some example embodiments, the mutually exclusive child classes include a third child class (e.g., node 419). As noted above with respect to FIG. 7, a visual pattern from the reference set (e.g., Font 3) may be classified (e.g., misclassified) into the first child class (e.g., node 411) instead of the second child class (e.g., node 415). This may have the effect of hard-splitting the parent class (e.g., node 410).

In operation 920, the classifier trainer module 250 modifies a weight vector that corresponds to the parent class (e.g., node 410). The modification of this weight vector may be in response to testing the accuracy of the hard-splitting performed in operation 910 and detection of any errors in classification. In other words, operation 920 may be performed in response to the visual pattern being misclassified into the first child class (e.g., node 411) instead of the second child class (e.g., node 415). For example, the modified weight vector may alter a first probability that the visual pattern belongs to the first child class (e.g., from 55% to 39%), and alter a second probability that the visual pattern belongs to the second child class (e.g., from 45% to 61%).

In operation 930, the assignment module 260, based on the altered probabilities, removes mutual exclusivity from the first and second child classes (e.g., nodes 411 and 415). For example, mutual exclusivity may be removed by adding the visual pattern to the second child class (e.g., node 415), so that both the first and second child classes include the visual pattern (e.g., a test font) and share it in common. According to various example embodiments, operations similar to operations 910-930 may be performed for any one or more additional classes to be included in the hierarchy. As an example, the first child class (e.g., node 411) may be subdivided into multiple grandchild classes (e.g., nodes 412 and 413) in a manner similar to the hard-splitting and soft-assignment described above for the parent class (e.g., node 410). Thus, where performance of operation 910 assigns a portion of the reference set of visual patterns to the first child class (e.g., node 411), a similar operation may classify this portion of the reference set into such grandchild classes (e.g., nodes 412 and 413).

In operation 940, the hierarchy module 270 generates a hierarchy of classes of visual patterns (e.g., an error-bounded tree of nodes that each represent the classes of visual patterns). In particular, the hierarchy module 270 may include the parent class (e.g., node 410) and the now mutually nonexclusive first and second child classes (e.g., nodes 411 and 415) that now each include the visual pattern.

In operation 950, the image classifier module 240 uses the generated hierarchy of classes to classify a candidate visual pattern (e.g., a font of unknown class or identity) by processing one or more images of the candidate visual pattern (e.g., an image of text rendered in the font). For example, the image classifier module 240 may traverse the hierarchy of classes, which may have the effect of omitting unrelated classifiers and executing only those classifiers with at least a minimum threshold probability of properly classifying a candidate visual pattern.

As shown in FIG. 10, the method 900 may include one or more of operations 1010, 1015, 1019, and 1020. One or more of operations 1010, 1015, and 1019 may be performed as part (e.g., a precursor task, a subroutine, or a portion) of operation 910, in which the image classifier module 240 classifies the reference set of visual patterns. In operation 1010, the image classifier module 240 computes an affinity matrix that quantifies similarity between or among the visual patterns. For example, the computed affinity matrix may quantify degrees to which the visual patterns are similar to each other. Moreover, the affinity matrix may be specific to the parent class (e.g., node 410) undergoing the hard-splitting discussed above with respect to operation 910. That is, each class (e.g., parent class) undergoing hard-splitting may have its own affinity matrix. Hence, according to various example embodiments, the image classifier module 240 may be or include a classifier that is assigned specifically to the parent class (e.g., node 410), and this classifier may include the weight vector (e.g., modified or unmodified) discussed above with respect to operation 920.

In operation 1015, the image classifier module 240 increases sparseness of the affinity matrix calculated in operation 1010 (e.g., makes the affinity matrix more sparse than initially calculated). In some example embodiments, this may be done by zeroing values of the affinity matrix that are below a minimum threshold value. In certain example embodiments, this may be done by zeroing values that fall outside the largest N values of the affinity matrix (e.g., values that lie outside the top 10 values or top 20 values). In some example embodiments, the values in the affinity matrix are representations of the vector distances between visual patterns. Hence, in some example embodiments, operation 1015 may be performed by setting one or more of such representations to zero based on those representations falling below a minimum threshold value. Similarly, in certain example embodiments, operation 1015 may be performed by setting one or more of such representations to zero based on those representations falling outside the top N largest representations.

In operation 1019, the image classifier module 240 groups the visual patterns into the mutually exclusive child classes (e.g., nodes 411 and 415) discussed above with respect to operation 910. For example, this grouping may be performed by applying spectral clustering to the affinity matrix computed in operation 1010. According to some example embodiments, the increased sparseness from operation 1015 may have the effect of reducing the number of computations involved, thus facilitating efficient performance of operation 1019.

As shown in FIG. 10, one or more of operations 1011, 1012, 1013, 1014 may be performed as part of operation 1010, in which the affinity matrix is computed. In operation 1011, the image classifier module 240 calculates feature vectors of images of the visual patterns in the reference set. These images may be accessed from the database 115. For example, the image classifier module 240 may access an image that depicts a particular visual pattern (e.g., Font 3, as discussed above with respect to FIGS. 6-8), and the image classifier module 240 may calculate a feature vector of this image. An example of a feature vector being calculated is discussed below with respect to FIGS. 17-22. As discussed below with respect to FIGS. 17-22, the calculating of a feature vector may be performed using LFE, such that the resulting feature vector has one or more locally embedded features.

In addition, according to some example embodiments, performance of operation 1011 may further calculate mean feature vectors that each represent groups of images depicting the visual patterns in the reference set. For example, there may be nine fonts (e.g., Fonts 1-9, as discussed above with respect to FIGS. 6-8), and each font may be depicted in 100 images of various numerals, letters, words, or phrases rendered in that font. In such a case, performance of operation 1011 may include calculating nine mean feature vectors, where each mean feature vector represents one of the nine fonts.

In operation 1012, the image classifier module 240 calculates vector distances between or among two or more of the feature vectors calculated in operation 1011. Continuing the above example, such vector distances (e.g., Mahalanobis distances) may be calculated among the nine mean feature vectors that respectively represent the nine fonts (e.g., Fonts 1-9, as discussed above with respect to FIG. 6-8). This may have the effect of calculating vector distances between the visual patterns in the reference set (e.g., with the visual patterns being represented by their respective mean feature vectors).

In operation 1013, the image classifier module 240 calculates representations of the vector distances for inclusion in the affinity matrix. For example, the vector distances may be normalized to values between zero and one (e.g., to obtain relative indicators of similarity between the visual patterns). As another example, the vector distances may be normalized by calculating a ratio of each vector distance to the median value of the vector distances. As a further example, normalization of the vector distances may be performed by calculating a ratio of each vector distance to the median value of the vector distances. According to various example embodiments, an exponential transform may be taken of the negative of these normalized values (e.g., such that the normalized values are negative exponentially transformed). Thus, such representations of the vector distances may be prepared for inclusion in the affinity matrix and subsequent spectral clustering.

In operation 1014, the image classifier module 240 includes the representations of the vector distances into the affinity matrix. As noted above, these representations may be normalized, negative exponentially transformed, or both.

In operation 1020, the image classifier module 240 checks its accuracy against the known (e.g., predetermined) classifications of the reference set of visual patterns. This may involve detecting one or more misclassifications and calculating a percentage of misclassifications (e.g., as an error rate from classifying the reference set in operation 910). Continuing the above example, if Font 3 is the only misclassified font among the nine fonts (e.g., Fonts 1-9), the detected misclassification percentage would be 11%. Based on this calculated percentage, the method 900 may flow on to operation 920, as described above with respect to FIG. 9. That is, operation 920 may be performed in response to the percentage calculated in operation 1020.

As shown in FIG. 10, after the weight vector is modified in operation 920, the method 900 may iterate back to operation 910, in which the image classifier module 240 performs the classification of the reference set of visual patterns, this time with the modified weight vector. In some example embodiments, the method 900 may include iterating operations 910, 1020, and 920 until the misclassification percentage falls below a threshold value (e.g., a maximum allowable error percentage for misclassifications). Accordingly, the initial performance of operation 910 may be described as being performed with the unmodified weight vector, while subsequent performances of operation 910 are performed with the modified weight vector (e.g., modified at least once by performance of operation 920).

As shown in FIG. 11, one or more of operations 1132, 1134, 1136, and 1138 may be performed as part of operation 930, in which the assignment module 260 removes mutual exclusivity from the first and second child classes (e.g., nodes 411 and 415) and performs the soft-assignment functions discussed above with respect to operation 930. In operation 1132, the assignment module 260 compares probabilities that the visual pattern (e.g., the test font) belongs to one or more of the child classes (e.g., node 411, 415, or 419) subdivided from the parent class (e.g., node 410) and ranks the probabilities (e.g., orders the probabilities by their values).

In operation 1134, the assignment module 260 includes the visual pattern (e.g., the test font) in multiple child classes based on the probabilities ranked in operation 1132 (e.g., allocates the visual pattern into the multiple child classes based on at least one of the probabilities). For example, supposing that there is a 39% first probability of the visual pattern belonging to the first child class (e.g., node 411), a 61% second probability of the visual pattern belonging to the second child class (e.g., node 415), and a 3% third probability that the visual pattern belongs to a third child class (e.g., node 419), the assignment module 260 may apply a rule that only the top two probabilities will be considered. Accordingly, the visual pattern may be included into the nodes 411 and 415, but not the node 419, based on the first and second probabilities being the top two probabilities and the third probability falling outside this subset. Hence, operation 930 may be performed based on the first and second probabilities being among a predetermined subset of largest probabilities, based on the third probability falling outside of the predetermined subset of largest probabilities, or based on any suitable combination thereof.

In alternative example embodiments, operations 1136 and 1138 are used instead of operations 1132 and 1134. In operation 1136, the assignment module 260 compares the probabilities discussed above with respect to operations 1132 and 1134 to a threshold minimum value (e.g., 10%). In operation 1138, the assignment module 260 includes the visual pattern (e.g., the test font) in multiple child classes based on these probabilities in comparison to the minimum threshold value (e.g., allocates the visual pattern into the multiple child classes based on a comparison of at least one of the probabilities to the minimum threshold value). For example, supposing that there is a 39% first probability of the visual pattern belonging to the first child class (e.g., node 411), a 61% second probability of the visual pattern belonging to the second child class (e.g., node 415), and a 3% third probability that the visual pattern belongs to a third child class (e.g., node 419), the assignment module 260 may apply a rule that only the probabilities above the minimum threshold value (e.g., 10%) will be considered. Accordingly, the visual pattern may be included into the nodes 411 and 415, but not the node 419, based on the first and second probabilities exceeding the minimum threshold value and the third probability failing to exceed this minimum threshold value. Hence, operation 930 may be performed based on the first and second probabilities exceeding the minimum threshold value, based on the third probability falling below the predetermined minimum threshold value, or based on any suitable combination thereof.

As noted above, the two-stage procedure performed by the recognition machine 110 may include (1) hard-splitting of nodes (e.g., representing font classes or individual fonts) and (2) soft-assignment of nodes to obtain an error-bounded tree in which nodes are allocated into hierarchical clusters. To illustrate hard-splitting of nodes, an illustrative example is presently explained in detail.

Suppose there are N font classes total in a current node i. The task is to assign these N fonts into C child nodes. In hard-splitting of nodes, each font class is assigned into exactly one child node. That is, the child nodes contain no duplicate font classes.

To calculate the distances between font classes, the recognition machine 110 may be configured to use LFE to represent each font image:

$$f = \{(z_k, x_{e_k})\}_{k=1}^{K},$$

where K is the codebook size, $z_k$ is pooling coefficient of the k-th code, and $x_{ek}$ represents the pooled local descriptor vector. Further details of LFE are provided below. Based on LFE-represented features, a mean vector $\mu_k^c$ for each font class may be computed as:

$$\mu_k^c = \frac{1}{Z^c} \sum_{i \in I_c} z_k^i x_{e_k}^i, \quad (A1)$$

and the recognition machine 110 may also calculate a within-class covariance matrix over all font classes, denoted by $\Sigma_k$. So now each font class may be represented as $\{(\mu_k^c, \Sigma_k)\}_{k=1}^{K}$. After this, the distance between each pair of fonts may be defined as:

$$d(c_1, c_2) = \sum_{k=1}^{K} w_k d_M(\mu_{c_1}^k, \mu_{c_2}^k), \quad (A2)$$

where $d_M(\mu_{c_1}^k, \mu_{c_2}^k) = \|\mu_k^{c_1} - \mu_k^{c_2}\|_{\Sigma_k}^2$ is the Mahalanobis distance between the template mean vectors $\mu_k^{c_1}$ and $\mu_k^{c_2}$, while $w_k$ is the weight to incorporate the importance of the k-th template. If the k-th template is more effective than other templates in separating the fonts, the system may assign it a larger weight. Initially the importance of the templates is unknown, so the recognition machine 110 may be configured to set all $w_k=1/C$ at first.

A sparse affinity matrix (e.g., an affinity matrix having increased sparseness) may be obtained next. After defining distances between font classes, the recognition machine 110 may build a distance matrix D with element $d_{ij}=d(c_i,c_j)$ and an affinity matrix A with elements expressed as: $A_{ij}=\exp(-d(c_i,c_j)/\sigma)$, where $\sigma$ is the scaling parameter. The affinity matrix A may be symmetric, and its diagonal elements may all be zero. According to various example embodiments, the meaning of matrix A is: the higher value of $A_{ij}$, the more similar are the corresponding two fonts $c_i$ and $c_j$.

With the full (e.g., non-sparse) affinity matrix A, the recognition machine 110 could use one or more classic clustering algorithms to cluster these fonts. In some example embodiments, the recognition machine 110 is configured to use spectral clustering to cluster the fonts. Supposing that these N fonts are to be clustered into K clusters, the steps for spectral clustering are:

1. Compute the diagonal matrix T with elements expressed as $T_{ii}=\Sigma_{j=1}^{N} A_{ij}$.

2. Compute the normalized Laplacian matrix: $L=T^{1/2}(T-A)T(½)$.

3. Compute and sort eigenvalues of matrix L in descending order: $\lambda_i \geq \lambda_i+1$, i=1, n?1.

4. Form a normalized matrix S using C largest eigenvectors.

5. Treating each row of S as a data point, cluster all the data points by K-means with cluster number C.

However, in certain example embodiments, clustering on a full affinity matrix A may be non-stable and thus poorly performed. Moreover, clustering may be quite sensitive to parameter $\sigma$. Without a carefully-tuned $\sigma$, the clustering may be unsuccessful. Consequently, a bad clustering operation may cause a font classification algorithm (e.g., an LFE-based algorithm) to fail. To solve these problems, the recognition machine 110 may be configured to perform operations that return stable and appropriate clustering results. For example, such operations may include the following:

1. Normalize the distance matrix D by dividing each element $d_{ij}$ by the median value d of matrix elements in D, i.e., $d=\text{median}(d_{ij})$.

2. Keep only the distance values of q-nearest fonts for each font. The distances with far fonts are set as inf. The parameter q may be chosen in this way: suppose there are total N font classes; if they are to be split into C clusters, then q=N/C.

3. Now the affinity matrix A is a sparse matrix. Note that the scaling parameter may be a fixed value of σ=1 (e.g., due to the normalization in step 1).

4. Make the affinity matrix A symmetric: $A \leftarrow \frac{1}{2}(A+A^T)$.

5. Finally, perform a spectral clustering algorithm on matrix A (e.g., as before).

In some example embodiments, the sparse affinity matrix works well compared to a self-tuning spectral clustering algorithm (e.g., much better and more stable). Moreover, there are no sensitive parameters, and parameter tuning may thus be avoided. This feature may be important for tree construction. Note that the above step 1 uses the median, not the mean, since from a statistical viewpoint, the median may be more stable than the mean.

Discriminative classification clustering may be implemented by the recognition machine 110. As mentioned above, the recognition machine 110 may factor in the importance weight $w_k$ when computing the font distance $d(c_1, c_2)$ in Equation 2. As discussed in detail below, training an LFE-based classifier may involve performing a template selection step and assigning a weight to each template feature. Templates that are better at classifying different fonts would be given more weight (e.g., larger weight value). In some example embodiments, this weight is used by the system as the importance weight $w_k$. In certain example embodiments, the recognition machine 110 initially sets $w_k=1/C$ and performs clustering on all fonts. After clustering N fonts into C clusters, the recognition machine 110 may treat each cluster as a new class and train the LFE-based classifier to classify these classes and get the weights $w_k$. Having obtained $w_k$, the recognition machine 110 may re-compute the distances between the font classes. Then the recognition machine 110 may obtain a new sparse affinity matrix and perform clustering again. This procedure may be repeated to get better clustering results. The algorithm steps may be expressed as the following operations:

1. Set all $w_k=1/C$, and perform the clustering algorithm discussed above.

2. Generate LFE-based feature vectors for the fonts (e.g., for images depicting the font), obtain a set of importance weights $\{w_k\}$ (e.g., as a weight vector stored as a template), and evaluate the accuracy of the current classification.

3. Based on the new template weights $\{w_k\}$, perform clustering again.

4. Repeat steps 2 and 3 until the classification performance (e.g., accuracy) converges.

According to various example embodiments, this discriminative classification clustering works well and iteratively improves classification performance (e.g., of an LFE-based classifier). Convergence may occur within 4 or 5 iterations.

As noted above, after hard-splitting nodes (e.g., representing font classes or individual fonts), the recognition machine 110 may perform soft-assignment of nodes to obtain an error-bounded tree in which nodes are allocated into hierarchical clusters. After hard-splitting, each font is assigned to one class (e.g., each font or font class in the node i only belongs to one child node). However, errors may propagate during tree growth. Suppose that after hard-splitting, the recognition machine 110 has assigned the fonts in a parent node into child nodes, and thus the recognition machine 110 may train an LFE-based classifier $f_i$ to classify a test font (e.g., font of known classification or identity) by determining to which child node it belongs. So if the test font is misclassified by $f_i$, then it will fall into the wrong child node, and this test font would never find its true font class (e.g., font label) in subsequent steps. If error of $f_i$ is denoted as $\epsilon_i$, then in this node layer, the classification accuracy is upper-bounded by $1-\epsilon_i$. The problem of error propagation may worsen when a node tree has multiple layers. This worsening of error propagation may characterize hierarchical algorithms.

To illustrate error propagation, suppose a tree has M layers, and a node layer i has upper-bounded classification accuracy $1-\epsilon_i$. Then the upper-bounded classification rate of the whole tree may be expressed as $\Pi_{i=1}^{M}(1-\epsilon_i)$. Suppose M=3, and $\epsilon_i$=0.15. Then best classification accuracy of this tree would be bounded by 0.614. In practice, $\epsilon_i$ may be much larger than 0.15. Thus, this error propagation problem may be quite serious.

To solve this error propagation problem, the recognition machine 110 may implement a method to perform soft-assignment of nodes, which may also be called error-bounded node splitting. After performing the hard-splitting method introduced above to get an initial splitting, and after training a classifier (e.g., an LFE-based classifier module) for a given node i, the recognition machine 110 may assign one or more visual patterns into multiple child nodes, based on the classification accuracy of each font class. To illustrate, imagine that a font class j is supposed to belong to a child node $c_i$. However, tests may indicate that a test font that represents font class j could fall into more child nodes $\{c_l, c_{l+1}, c_{l+2}, \ldots, c_L\}$. In such a case, the recognition machine 110 may compute the probability that the test data for font class j falls into these child nodes $\{p_l, p_{l+1}, p_{l+2}, p_L\}$. The recognition machine 110 then may select the top R child nodes $\{c_r, c_{r+1}, c_R\}$ with the highest probability such that the summation of the probability is larger than a pre-set threshold: $\Sigma_{r=1}^{R} p_r \geq \theta$. Then, the recognition machine 110 may assign this font r=class into the child nodes $\{c_r, c_{r+1}, c_R\}$.

Accordingly, the recognition machine 110 may ensure that the classification accuracy of each font in this node i is at least $\theta_i$. Thus, the recognition machine 110 may bound the error rate of each node to less than $1-\theta_i$. As a result, the upper-bound classification rate of the entire tree would be $\Pi_{i=1}^{M}\theta_i$. In some example embodiments, the recognition machine 110 may be configured to use $\theta_i$=0.95 or higher, so that, if M=3, the upper-bounded classification accuracy of the tree would be 0.857, which would be much higher than without using this soft-assignment technique.

The time used by the recognition machine 110 for font class soft-assignment may depend on the average number of child nodes into which each font class is softly assigned. In general, if a font class is assigned into too many child nodes, the computation complexity is increased, potentially to impractical levels. In certain example embodiments, the recognition machine 110 may be configured to perform soft-assignment of font classes into an average assignment ratio of 2.2 to 3.5 nodes, which may only slightly burden the computation.

Together, the hard-splitting of nodes and the soft-assignment of nodes may result in error-bounded splitting of nodes into clusters, which may also be called error-bounded tree construction. Suppose there are N font classes total, and the root node of the tree has C child nodes. Then the above-described hard-splitting technique may be used by the system to assign the N fonts into C child nodes. Subsequently, the recognition machine 110 may use the above-described soft-assignment technique to reassign the N fonts into C child nodes with certain error bounds, denoting the average assignment ratio for each font as R. Thus, each child node i contains on average $N_i$=RN/C font classes. Then, for a given child node i, the recognition machine 110 may continue to split it by dividing its $N_i$ font classes into $C_i$ children. Following the same procedure, the recognition machine 110 may build up a hierarchical error-bounded tree of nodes. In some example embodiments, the recognition machine 110 builds a 2-layer tree in which the first layer contains the C child nodes of the root node, and in which each child node has a certain number of fonts. In such example embodiments, the second layer may contain leaf nodes such that each node in the second layer only contains one font class.

Figure 12:
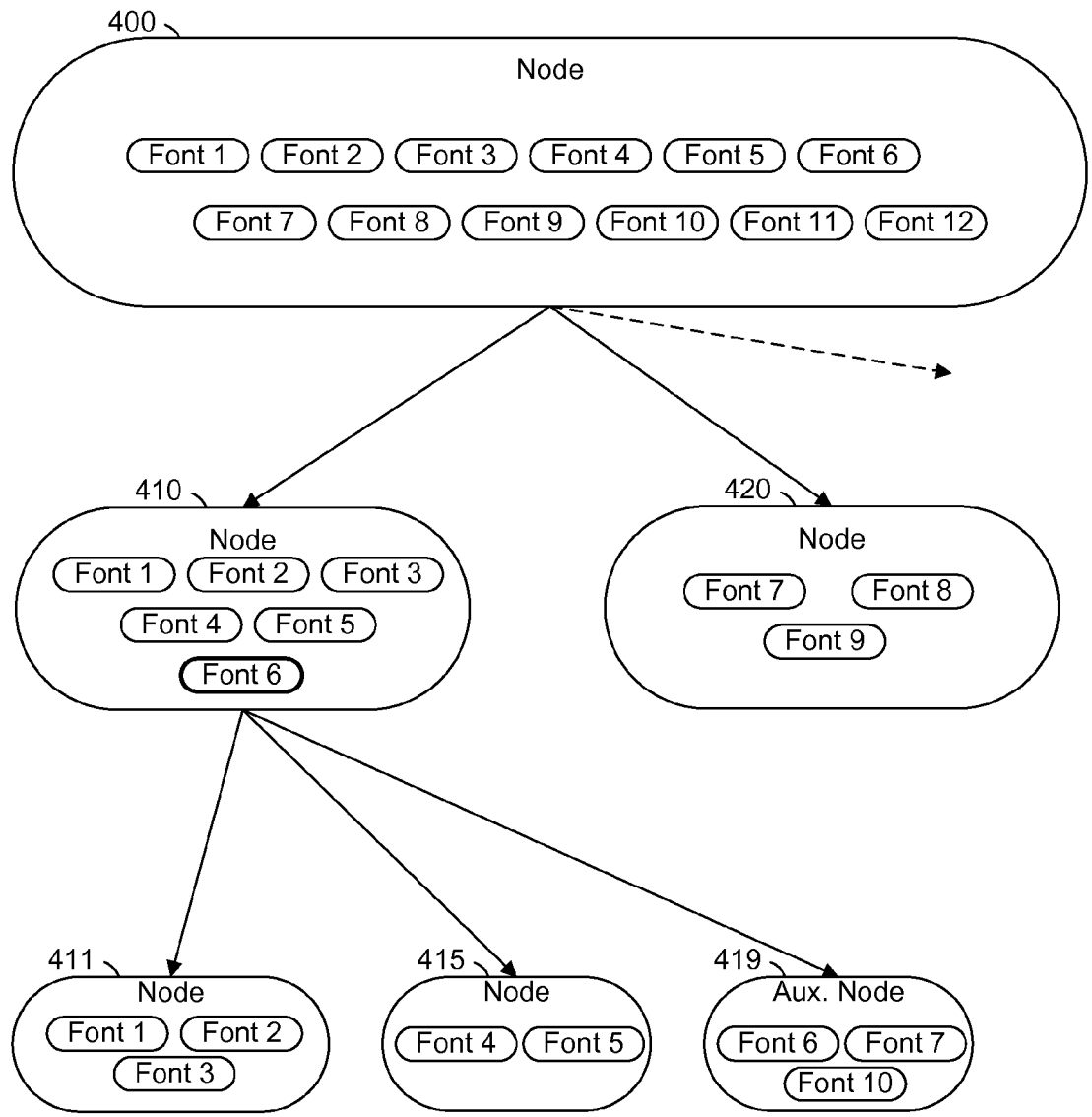
FIGS. 12 and 13 are conceptual diagrams illustrating a hierarchy of visual pattern classes, according to some example embodiments.
Figure 13:
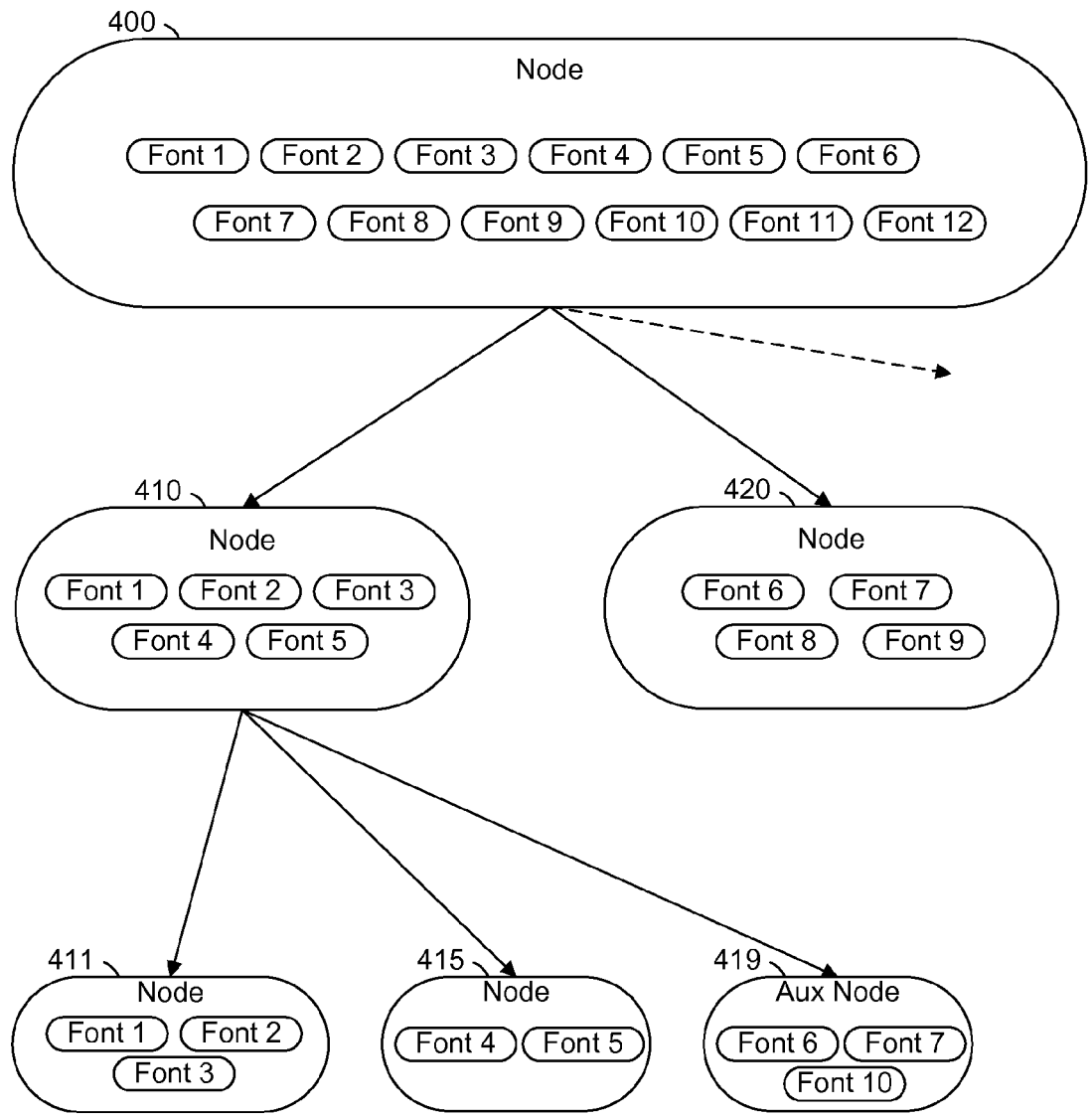

FIGS. 12 and 13 are conceptual diagrams illustrating a hierarchy of visual pattern classes, according to some example embodiments. More specifically, the hierarchy of FIGS. 12 and 13 illustrate the use of auxiliary nodes or classes as another method by which to reclassify previously misclassified training images so that the classifiers of the parent nodes of the hierarchy may more accurately determine the classification of candidate images. In some examples, the use of auxiliary nodes can be employed in place of, or in addition to, the utilization of the hard-splitting/soft-assignment mechanism discussed above in conjunction with FIGS. 6-11.

In FIG. 12, the node 400 (e.g., root node) may be a top-level class of visual patterns, and this top-level class may encompass multiple visual patterns in the example form of fonts (e.g., Font 1, Font 2, Font 3, Font 4, Font 5, Font 6, Font 7, Font 8, Font 9, Font 10, Font 11, and Font 12). These fonts may form all or part of a reference set of visual patterns (e.g., a test set of visual patterns with known classifications) that are usable to train one or more classifiers.

Suppose that Fonts 1-6 have been classified (e.g., by a classifier module, such as the image classifier module 240) into the node 410 by a classifier associated with node 400. Another classifier (e.g., a classifier that is specific to the node 410) may subdivide (e.g., split, cluster, or otherwise allocate into portions) the node 410 into child nodes, such as the nodes 411, 415, and 419, which may be mutually exclusive (e.g., at least upon this initial subdividing). More specifically, the classifier of node 410 may assign Fonts 1-3 to node 411, Fonts 4 and 5 to node 415, and Font 6 to auxiliary node 419. In this example, also classified to the auxiliary node 419 are Fonts 7 and 10.

In at least some examples, the auxiliary node 419 serves as a child node to parent node 410. The auxiliary node 419 may serve as a repository (e.g., an error correction node) to which fonts which were mistakenly classified to parent node 410 may be classified, and thus are not classified to either nodes 411 or 415. In this case, the classifier for the root node 400 has incorrectly assigned Font 6 to node 410, resulting in Font 6 being assigned to the auxiliary node 419. In some implementations, other fonts classified in the auxiliary node 419 are intentionally drawn from other fonts of the root node 400 that are not classified in the parent node 410 (e.g., Font 7, classified with node 420, and Font 10, classified with another child node of root node 400 not explicitly shown in FIG. 6). In one example, the other fonts of the auxiliary node 419 are randomly selected from the sibling nodes (e.g. node 420) of the parent node 410. In another example, the other fonts of the auxiliary node 419 represent nodes from sibling nodes of the parent node 410 (e.g., node 420) that are most similar to those fonts that are correctly classified in the child nodes of the parent node 410. By selecting more similar fonts, the classifier for the parent node 410 may possess a finer ability to identify those fonts that are incorrectly classified in the parent node 410. In each case, the other fonts (e.g., Fonts 7 and 10) classified in auxiliary node 419 may concurrently and correctly be assigned to other nodes of the hierarchy.

As shown in FIG. 13, in response to the classifier of node 410 assigning a font (e.g., Font 6) to the auxiliary node 419, the classifier of the parent of the parent node 410 (e.g., root node 400) may then reassign that font to a sibling node (e.g., node 420) of the parent node 410. In one example, that classifier may assign the font based on removing the original parent node 410 from consideration, and reassigning the font to the most likely remaining sibling node to which the font may be classified. In one example, the font may be assigned to the sibling node while remaining assigned to the auxiliary node 419 that is a child node of the parent node 410, thus allowing the font to remain as an example of a font that was incorrectly assigned to the parent node 410.

In some examples, any or all of the non-auxiliary descendant nodes of the root node 400 (e.g., nodes 410, 411, 415, 420, and so on) may have a child node that serves as an auxiliary node, as described above. In addition, while the use of auxiliary nodes is described herein in conjunction with the training of classifiers using training fonts or images, auxiliary nodes may also be employed in the classification of candidate fonts or images in some embodiments.

Figure 14:
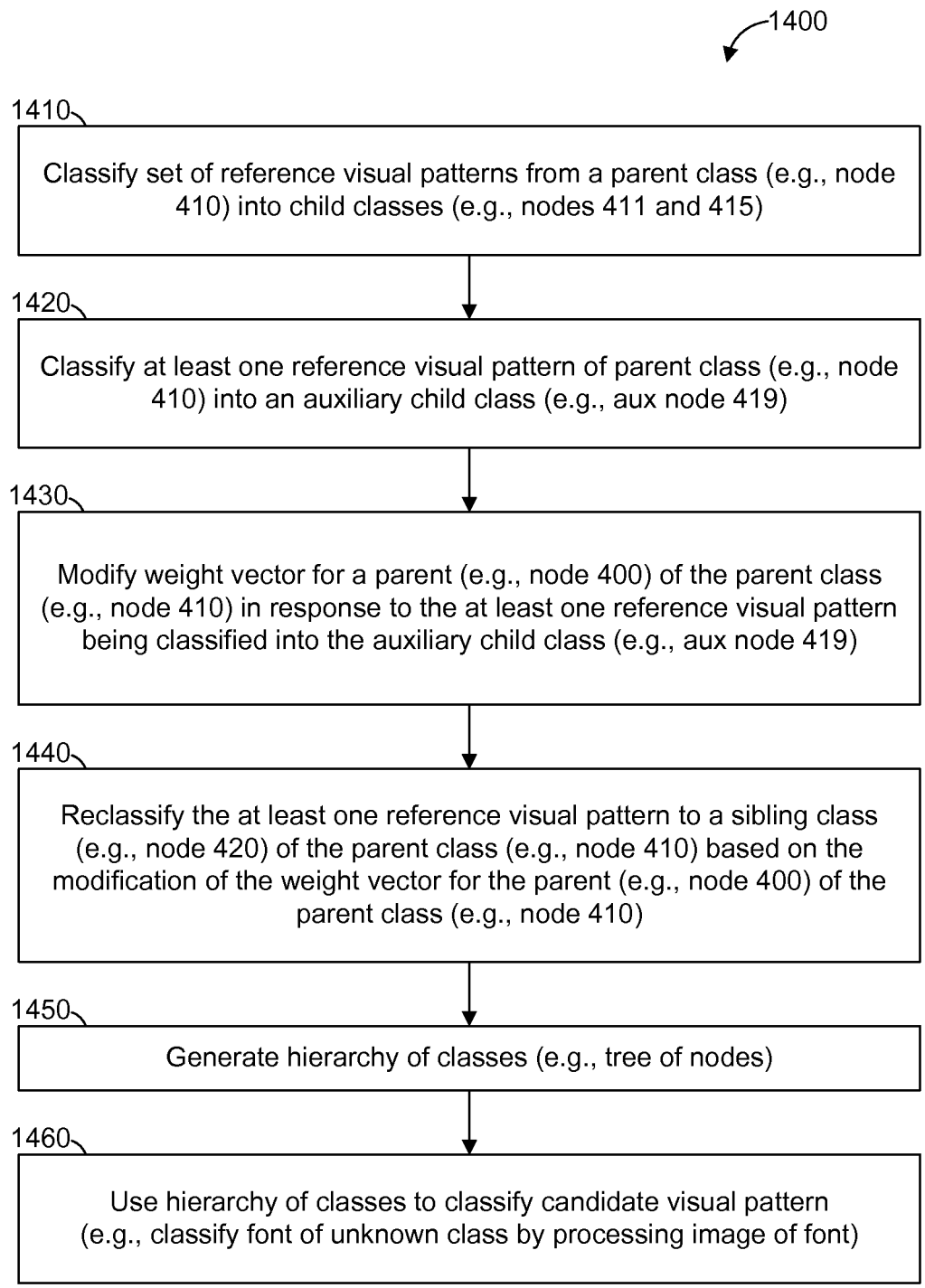
FIGS. 14-16 are flowcharts illustrating operations of the recognition machine in performing a method of generating the hierarchy of visual pattern classes, according to some example embodiments.
Figure 15:
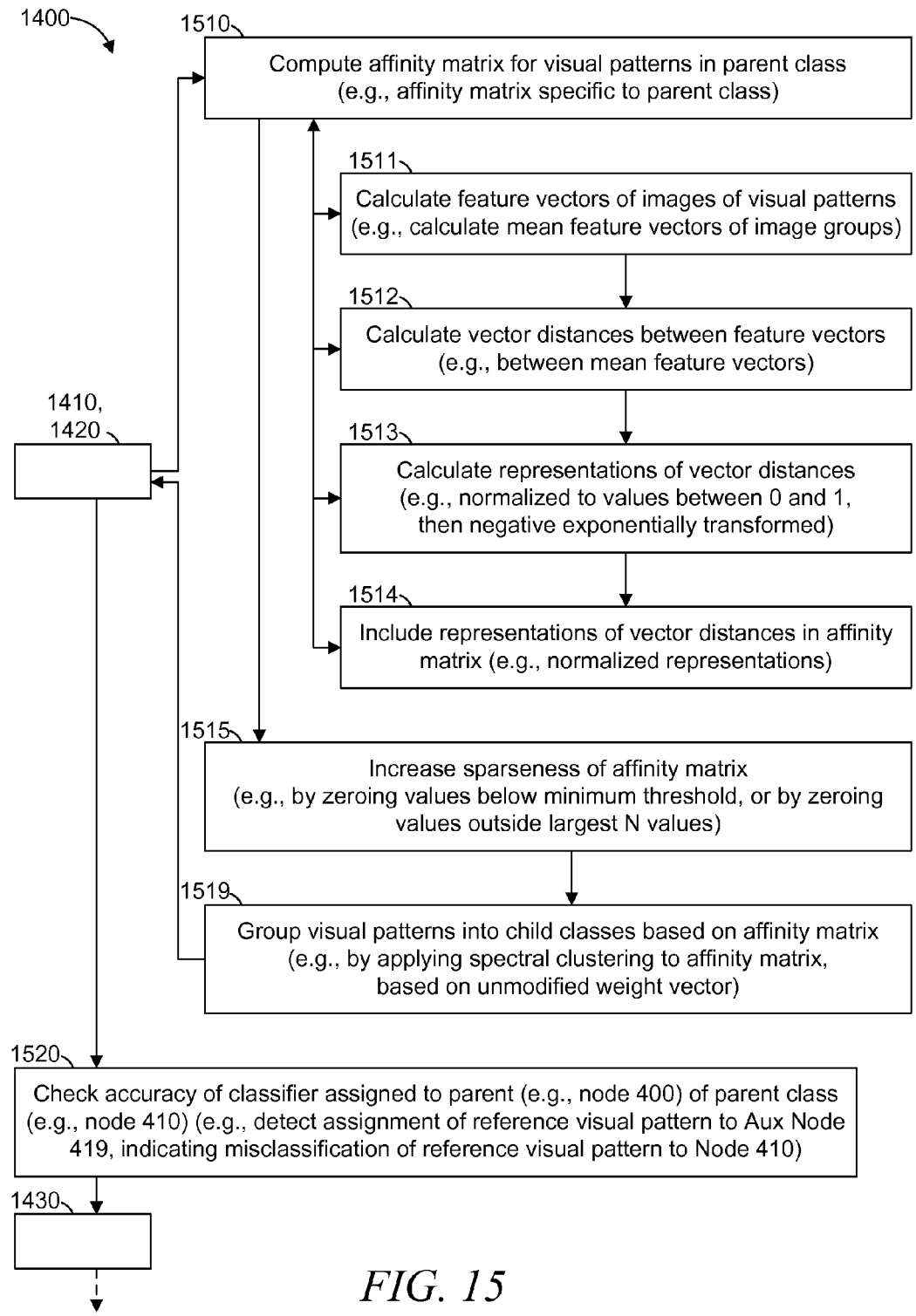
Figure 16:
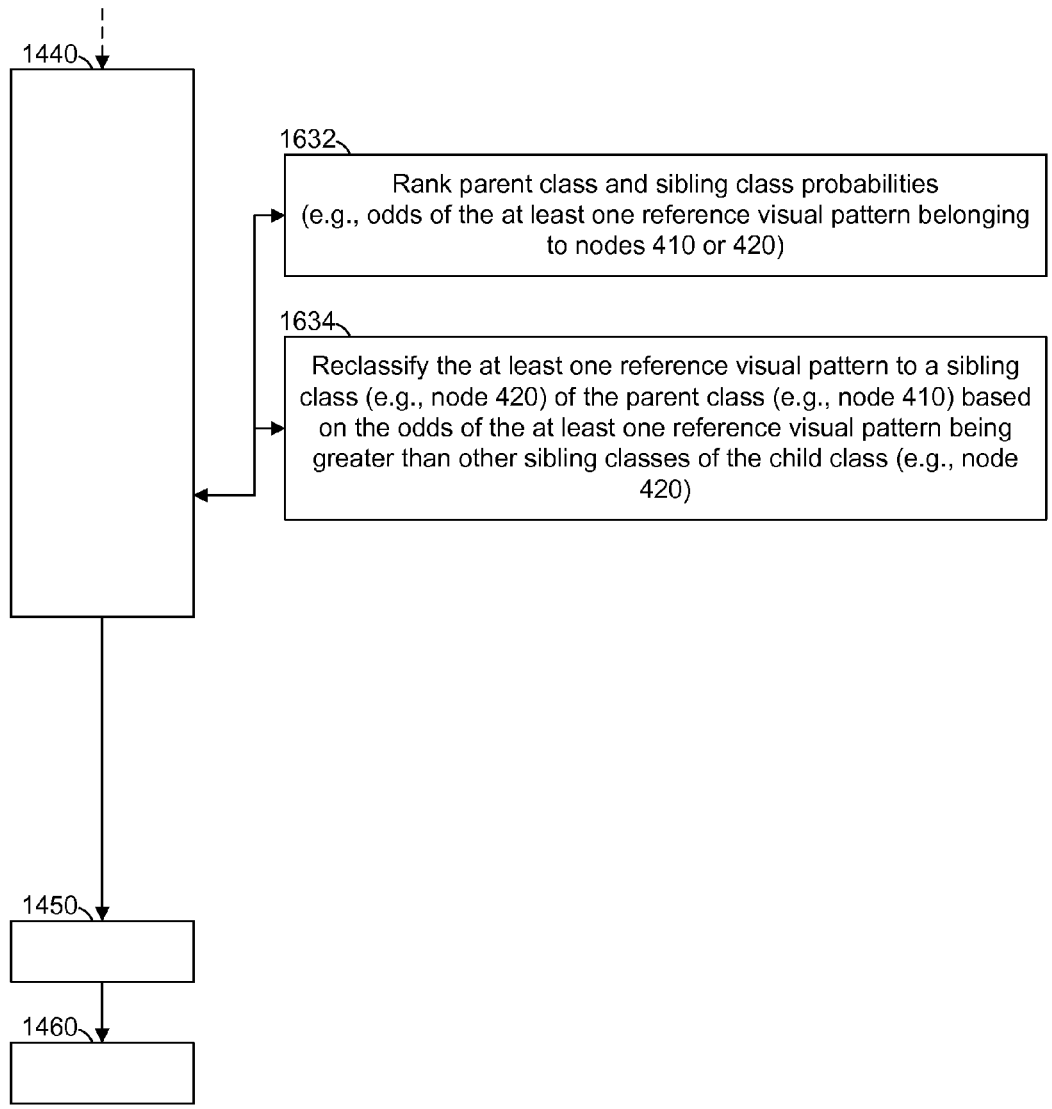

FIGS. 14-16 are flowcharts illustrating operations of the recognition machine in performing a method of generating the hierarchy of visual pattern classes, according to some example embodiments. More specifically, FIG. 14 illustrates a method 1400 of employing auxiliary nodes to reclassify incorrectly classified images or visual patterns (e.g., fonts) during training of a hierarchical classification scheme. In the method 1400, a set of reference visual patterns from a parent class (e.g., node 410) is classified into one or more child classes (e.g., nodes 411 and 415) (operation 1410). At least one reference visual pattern of the parent class (e.g., node 410) is classified into an auxiliary child class (e.g., auxiliary node 419) (operation 1420). A weight vector for a parent class (e.g., root node 400) of the parent class (e.g., node 410) may be modified in response to the reference visual pattern being classified in the auxiliary child class (e.g., auxiliary node 419) (operation 1430). In one example, the weight vectors may be modified such that the probability of the misclassified font belonging to the parent class (e.g., node 410) is decreased, while the probability of the misclassified font belonging to a sibling class (e.g., node 420) of the parent class (e.g., node 420) is increased. Accordingly, in operation 1440, the reference visual pattern may be reclassified to a sibling class (e.g., node 420) of the parent class (e.g., node 410) based on the modification of the weight vector for the parent class (e.g., node 400) of the parent class (e.g., node 410). In some examples, operations 1420 through 1440 may be employed on multiple reference visual patterns at different nodes of the hierarchy, and may be executed multiple times on a single reference visual pattern.

The hierarchy of classes may be generated at least in part due to the execution of operations 1410-1440 (operation 1450). The resulting hierarchy of classes may then be used to classify one or more candidate visual patterns (operation 1460), such as fonts, as described above. In some implementations, auxiliary nodes may also be employed to reverse, and prevent propagation of, misclassification of one or more candidate visual patterns.

In FIG. 15, the method 1400 may include one or more of operations 1510, 1515, 1519, and 1520. One or more of operations 1510, 1515, and 1519 may be performed as part (e.g., a precursor task, a subroutine, or a portion) of operation 1410 and/or 1420, in which the image classifier module 240 classifies the reference set of visual patterns. In addition, each of operations 1510, 1515, and 1519 may be the same as, or similar to, operations 1010, 1015, and 1019 of FIG. 10, described above. Also as shown in FIG. 15, one or more of operations 1511, 1512, 1513, 1514 may be performed as part of operation 1510. In some examples, each of operations 1511, 1512, 1513, and 1514 may be the same as, or similar to, operations 1011, 1012, 1013, 1014, as discussed in greater detail above.

In operation 1520, the accuracy of a classifier assigned to a parent class (e.g., root node 400) of the current parent class (e.g., node 410) may be checked. For example, an assignment or classification of a reference visual pattern (e.g., Font 6) to an auxiliary node (e.g., node 419) may indicate that the parent class (e.g. root node 400) of the current patent class (e.g., parent node 410) has misclassified the reference visual pattern. As a result of that misclassification, a weight vector for the parent class (e.g., node 400) of the current parent class (e.g., node 410) may be modified in operation 1430, as described above.

Also as noted above, the reference visual pattern may be reclassified to a sibling class (e.g. node 420) of the parent class (e.g., node 410), as described above in conjunction with operation 1440, as a result of the modification of the weight vector. As shown in FIG. 16, one or more of operations 1632 and 1634 may be performed as part of operation 1440. In operation 1632, the assignment module 260 may compare probabilities that the reference visual pattern (e.g., Font 6) belongs to one or more of the parent class (e.g., node 410) and its sibling classes (e.g., node 420) subdivided from the parent class (e.g., node 400) of the parent class (e.g., node 410) and rank the probabilities (e.g., order the probabilities by their values).

In operation 1634, the assignment module 260 may reclassify the reference visual pattern to a sibling class (e.g., node 420) of the parent class (e.g., node 410) based on the probabilities ranked in operation 1632. In one example, the sibling class to which the reference visual pattern is assigned is the highest-ranked class among the sibling classes of the parent class. In some embodiments, such an assignment to one of the sibling classes may occur even if the parent class remains the highest-ranked class of its level.

Figure 17:
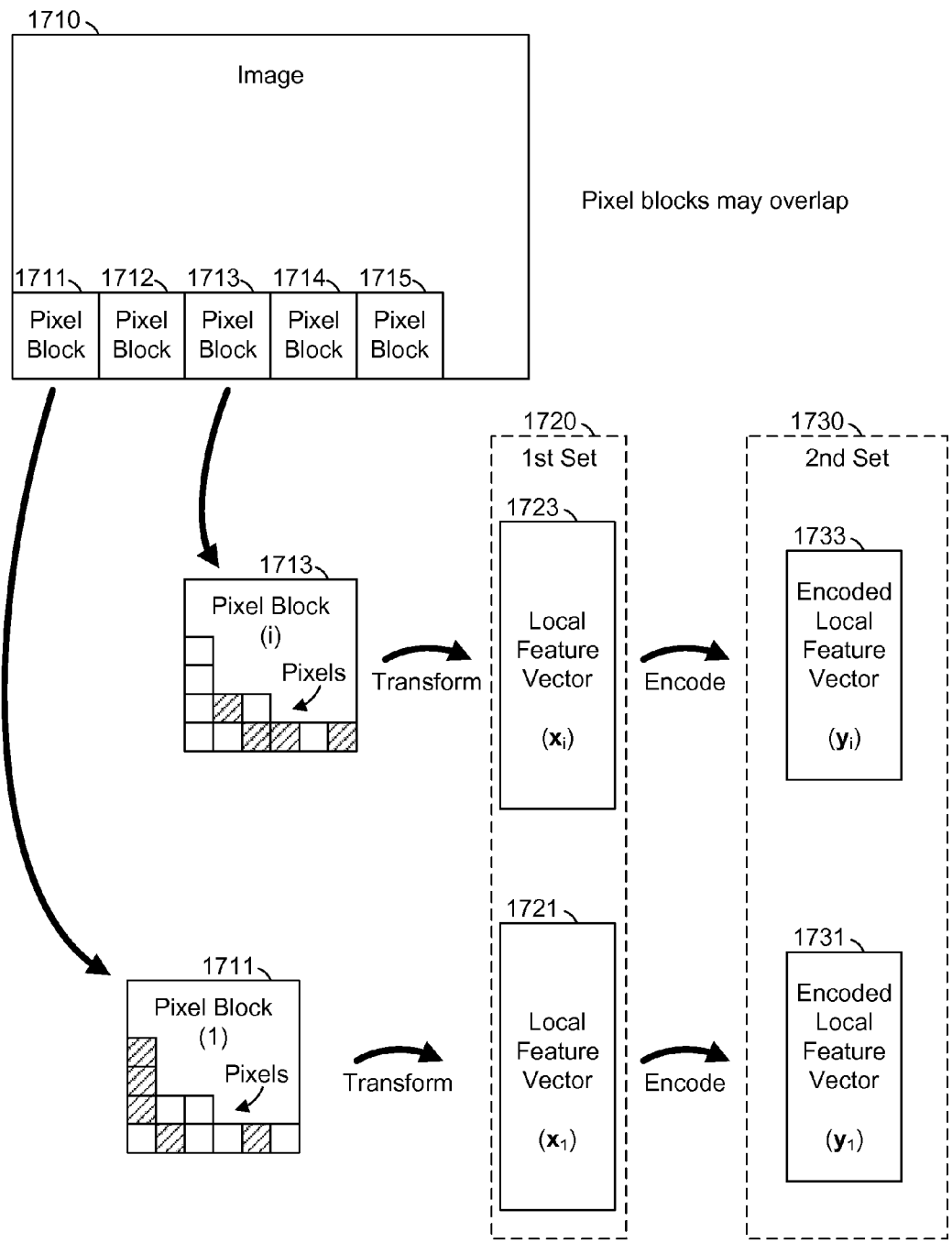
FIG. 17 is a conceptual diagram that illustrates generation and encoding of local feature vectors from pixel blocks of an image, according to some example embodiments.

Regarding details of LFE, FIG. 17 is a conceptual diagram that illustrates generation and encoding of local feature vectors (e.g., local feature vectors 1721 and 1723) from pixel blocks (e.g., pixel blocks 1711 and 1713) of a visual pattern or image 1710, according to some example embodiments. The image 1710 (e.g., a digital picture or photo) may depict a visual pattern (e.g., text rendered in a font, an object, a face, a scene, or any suitable combination thereof). The image 1710 may be stored in the database 115 and accessed by the image access module 210 of the recognition machine 110.

As shown in FIG. 17, the image 1710 may be divided (e.g., by the feature vector module 220 of the recognition machine 110) into blocks of pixels (e.g., pixel blocks 1711, 1712, 1713, 1714, and 1715). In some example embodiments, the pixel blocks overlap each other. That is, neighboring (e.g., adjacent) pixel blocks may overlap by one or more pixels (e.g., 10 pixels). The pixel block 1711 may be a first pixel block (e.g., having an index of 1 or indexed as 1) of the image 1710, and the pixel block 1713 may be an i-th pixel block (e.g., having an index of i) of the image 1710.

FIG. 17 illustrates the pixel block 1713 (e.g., the i-th pixel block) undergoing a mathematical transformation to generate a corresponding local feature vector 1723 (e.g., an i-th local feature vector, labeled "$x_i$") describing the pixel block 1713, thus indicating a local feature of the image 1710 that is associated with the pixel block 1713. This mathematical transformation may be performed by the feature vector module 220. Similarly, the pixel block 1711 (e.g., the first pixel block) may be mathematically transformed to generate its corresponding local feature vector 1721 (e.g., a first local feature vector, labeled "$x_1$"). This process may be repeated for all pixel blocks in the image 1710 (e.g., pixel blocks 1712, 1714, and 1715, as well as other pixel blocks in the image 1710). Accordingly, these generated local feature vectors (e.g., local feature vectors 1721 and 1723) may constitute a first set 1720 of vectors (e.g., local feature vectors) for the image 1710.

According to some example embodiments, the first set 1720 of vectors may each have a same number of dimensions, which may be called a first number of dimensions. For example, the first set 1720 of vectors may each have 10 dimensions as a result of the mathematical transformation being applied to each of the pixel blocks (e.g., pixel blocks 1711-1715) of the image 1710.

FIG. 17 further illustrates the first set 1720 of vectors being encoded (e.g., by the feature vector module 220) to generate a second set 1730 of vectors (e.g., encoded local feature vectors) for the image 1710. As shown, the second set 1730 of vectors includes an encoded local feature vector 1733 (e.g., an i-th encoded local feature vector, labeled "$y_i$") that corresponds to the local feature vector 1723 (e.g., the i-th local feature vector). That is, the encoded local feature vector 1733 may be an encoded representation of the local feature vector 1723. Similarly, the second set 1730 of vectors includes encoded local feature vector 1731 (e.g., a first encoded local feature vector, labeled "$y_1$") that corresponds to the local feature vector 1721 (e.g., the first local feature vector), and the encoded local feature vector 1731 may be an encoded representation of the local feature vector 1721.

According to certain example embodiments, the second set 1730 of vectors may each have a same number of dimensions, which may be distinct from the first number of dimensions for the first set 1720 of vectors, and which may be called a second number of dimensions. For example, the second set 1730 of vectors may each have six dimensions as a result of the encoding process being applied to each local feature vector of the first set 1720 of vectors for the image 1710.

Figure 18:
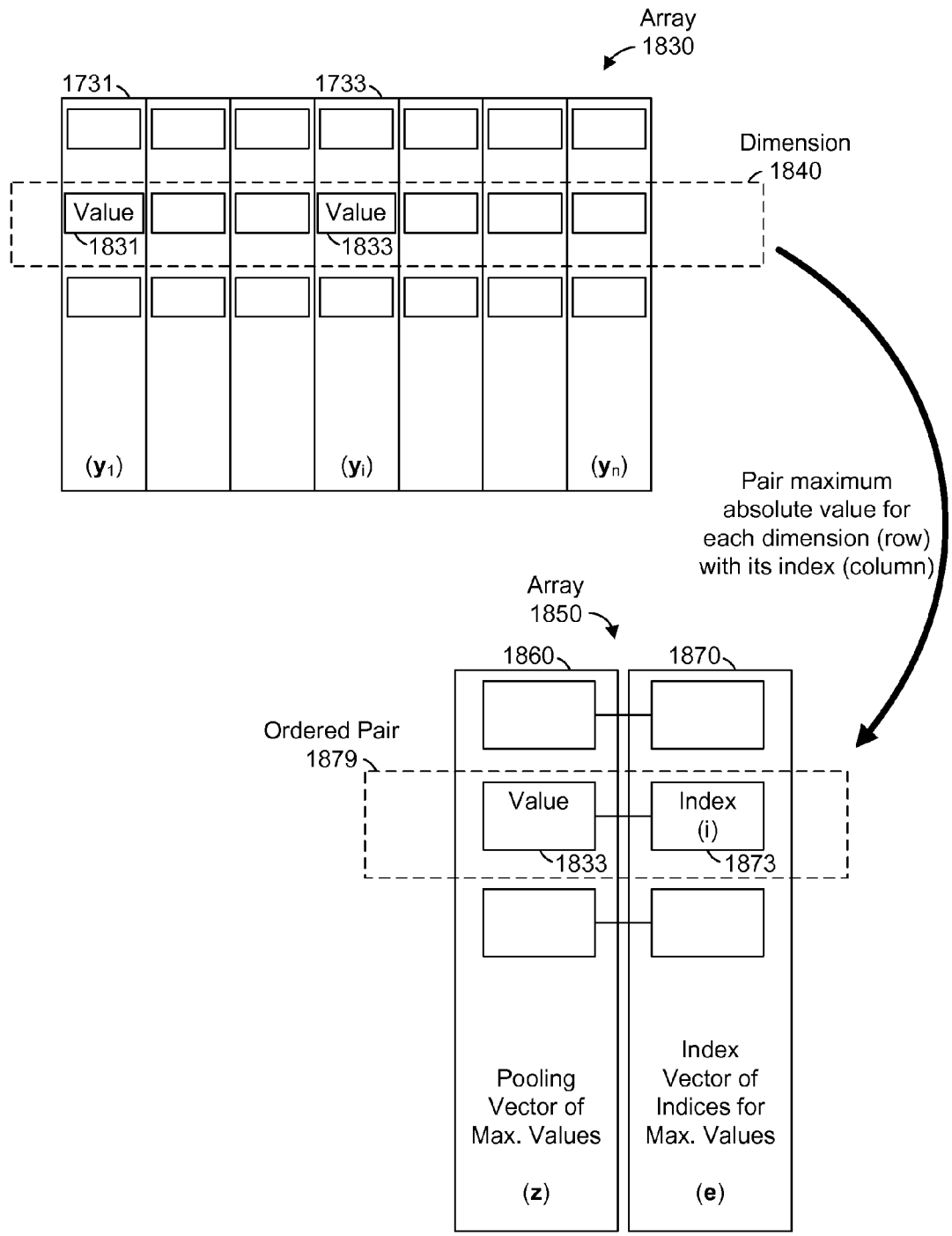
FIG. 18 is a conceptual diagram that illustrates generation of a first array of ordered pairs for the image, according to some example embodiments.

FIG. 18 is a conceptual diagram that illustrates generation of a first array 1850 of ordered pairs (e.g., ordered pair 1879) for the image 1710, according to some example embodiments. This generation of the first array 1850 may be performed by the feature vector module 220 of the recognition machine 110. As shown, the second set 1730 of encoded local feature vectors (e.g., encoded local feature vectors 1731 and 1733, as discussed above with respect to FIG. 17) may be arranged as an array 1830 of encoded local feature vectors (e.g., encoded local feature vectors 1731 and 1733) for the image 1710.

As noted above, each of the encoded local feature vectors (e.g., encoded local feature vectors 1731 and 1733) in the second set 1730 of vectors may have the same number (e.g., second number) of dimensions. Thus, in the array 1830, the feature vector module 220 may compare values (e.g., values 1831 and 1833) of a particular dimension 1840 for each of these encoded local feature vectors (e.g., 1731 and 1733). This concept is illustrated in FIG. 18 by depicting the encoded feature vectors side-by-side in the array 1830, so that the dimension 1840 is represented by a row within the array 1830, while each encoded local feature vector is represented by a column within the array 1830. Hence, the value 1831 of the dimension 1840 in the encoded local feature vector 1731 may be compared to the value 1833 of the same dimension 1840 in the encoded local feature vector 1733.

By comparing values (e.g., comparing value 1831 to value 1833), the feature vector module 220 may identify a value for the dimension 1840 that significantly characterizes the image 1710. For example, the feature vector module 220 may compare all values for the dimension 1840 and determine that the value 1833 has a maximum absolute value (e.g., is a maximum value or a minimum value) among all other values (e.g., value 1831) for the dimension 1840 within the array 1830 of encoded local feature vectors. This process may be performed for each dimension (e.g., dimension 1840) represented in the second set 1730 of encoded local feature vectors (e.g., encoded local feature vectors 1731 and 1733). Accordingly, the feature vector module 220 may identify, determine, or otherwise obtain a characteristic value (e.g., a maximum absolute value or a maximum value) for each dimension of the encoded local feature vectors.

As shown in FIG. 18, these characteristic values may be paired (e.g., by the feature vector module 220) with indices that indicate which encoded local feature vector corresponds to which characteristic value. In other words, each characteristic value may be paired with the index of its corresponding encoded local feature vector, which is also the index of its corresponding pixel block within the image 1710. This may be accomplished by generating a pooling vector 1860 (e.g., a pooling vector of maximum values, labeled "z") and an index vector 1870 (e.g., an index vector of indices for maximum values, labeled "e"), and then generating the first array 1850 of ordered pairs (e.g., ordered pair 1879), where the ordered pairs map each characteristic value (e.g., value 1833) with its corresponding index (e.g., index 1873).

In the example shown in FIG. 18, the characteristic values are maximum values. Accordingly, the pooling vector 1860 is a vector of maximum values for the dimensions (e.g., dimension 1840) that are represented in the second set 1730 of encoded local feature vectors, and the index vector 1870 is a vector of indices for these maximum values. As an example, the value 1833 may be the maximum value for the dimension 1840, and the value 1833 corresponds to (e.g., comes from) the encoded local feature vector 1733, which may be the i-th encoded local feature vector in the second set 1730 of encoded local feature vectors (e.g., corresponding to the i-th pixel block 1713 of the image 1710). Therefore, the feature vector module 220 may pair the value 1833 with the index 1873 (e.g., labeled "i") to generate the ordered pair 1879.

By generating an ordered pair for each dimension (e.g., dimension 1840) of the array 1830 of encoded local feature vectors, the feature vector module 220 may generate the first array 1850 of ordered pairs. In some example embodiments, the feature vector module 220 generates the first array 1850 of ordered pairs by mapping the pooling vector 1860 to the index vector 1870, and storing the result as the first array 1850 of ordered pairs.

Figure 19:
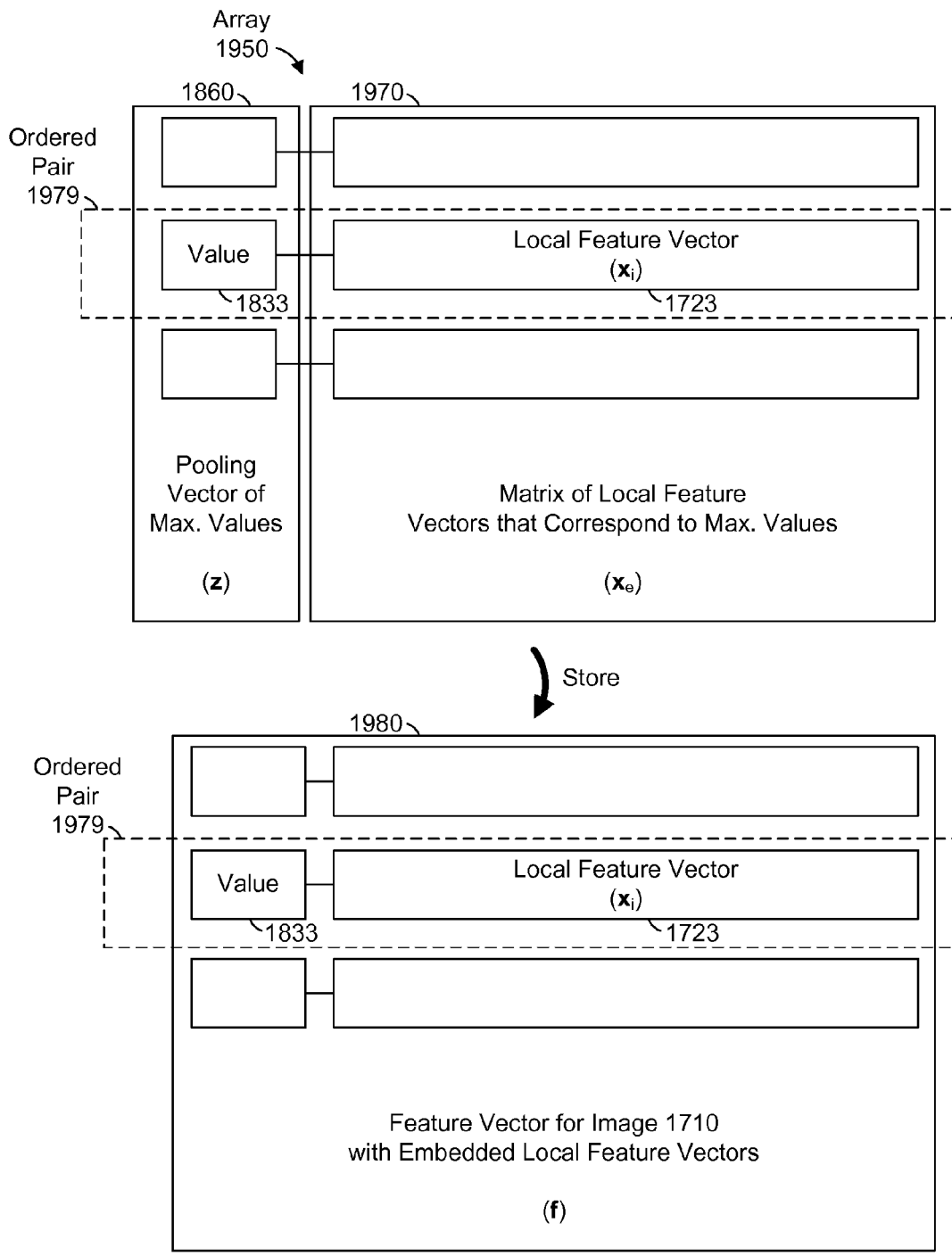
FIG. 19 is a conceptual diagram that illustrates generation of a second array of ordered pairs for the image, according to some example embodiments.

FIG. 19 is a conceptual diagram that illustrates generation of a second array 1950 of ordered pairs (e.g., ordered pair 1979) for the image 1710, according to some example embodiments. This generation of the second array 1950 may be performed by the feature vector module 220 of the recognition machine 110. As shown, the values (e.g., value 1833) of the pooling vector 1860 (e.g., a vector of maximum values, as discussed above with respect to FIG. 18) may be paired with their corresponding local feature vectors (e.g., local feature vector 1723 from the first set 1720 of local feature vectors, as discussed above with respect to FIG. 17).

In FIG. 19, this is shown by arranging the pooling vector 1860 with a matrix 1970 (e.g., labeled "$x_e$") of local feature vectors that correspond to the values (e.g., value 1833) of the pooling vector 1860. As an example, the value 1833 may be the characteristic (e.g., maximum) value for the dimension 1840, and the value 1833 corresponds to (e.g., comes from) the local feature vector 1723, which may be the i-th local feature vector in the first set 1720 of local feature vectors (e.g., corresponding to the i-th pixel block 1713 of the image 1710). Therefore, the feature vector module 220 may pair the value 1833 with the local feature vector 1723 (e.g., labeled "$x_i$") to generate the ordered pair 1979. In certain example embodiments, the local feature vector 1723 is identified based on an index (e.g., "i") of its corresponding encoded local feature vector 1733.

By generating an ordered pair for each dimension (e.g., dimension 1840) of the array 1830 of encoded local feature vectors, the feature vector module 220 may generate the second array 1950 of ordered pairs (e.g., ordered pair 1979). In some example embodiments, the feature vector module 220 generates the second array 1950 of ordered pairs by starting with the first array 1850 of ordered pairs and replacing the index vector 1870 with the matrix 1970 of local feature vectors.

As shown in FIG. 19, the resulting second array 1950 of ordered pairs may be stored as a feature vector 1980 (e.g., labeled "f") that corresponds to the image 1710 in its entirety. For example, after generating the second array 1950 of ordered pairs, the vector storage module 230 may store the second array 1950 in the database 115 as the feature vector 1980 for the image 1710. Similar to the second array 1950 of ordered pairs, the feature vector 1980 maps the values (e.g., value 1833) from the pooling vector 1860 to their corresponding local feature vectors (e.g., local feature vector 1723). This may have the effect of building a single vector of characteristic values (e.g., value 1833) for each dimension (e.g., dimension 1840) represented in the second set 1730 of encoded local feature vectors, where these characteristic values are paired with their respective original (e.g., unencoded) local feature vectors (e.g., local feature vector 1723). Thus, the feature vector 1980 for the image 1710 may provide a subset of its original local feature vectors (e.g., a subset of the first set 1720 of local feature vectors) along with corresponding characteristic values (e.g., maximum values) from their encoded counterparts (e.g., in the second set 1730 of encoded local feature vectors). Hence, the feature vector 1980 may be described as including (e.g., embedding) the most significant local feature vectors of the image 1710 (e.g., most significant for the purpose of recognizing of coarse-grained and fine-grained visual patterns).

Figure 20:
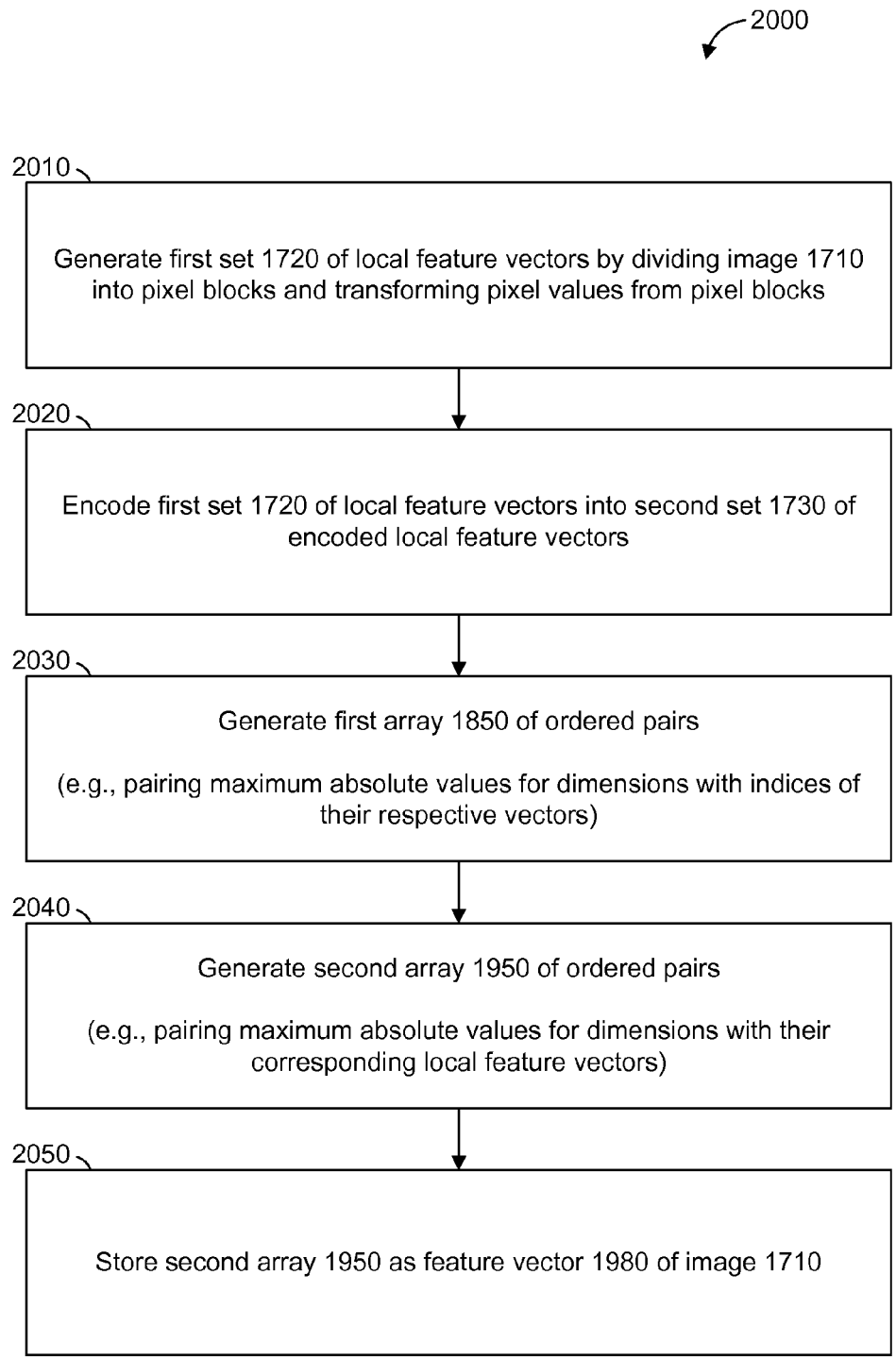
FIGS. 20-22 are flowcharts illustrating operations of the recognition machine in performing a method of processing the image, according to some example embodiments.
Figure 21:
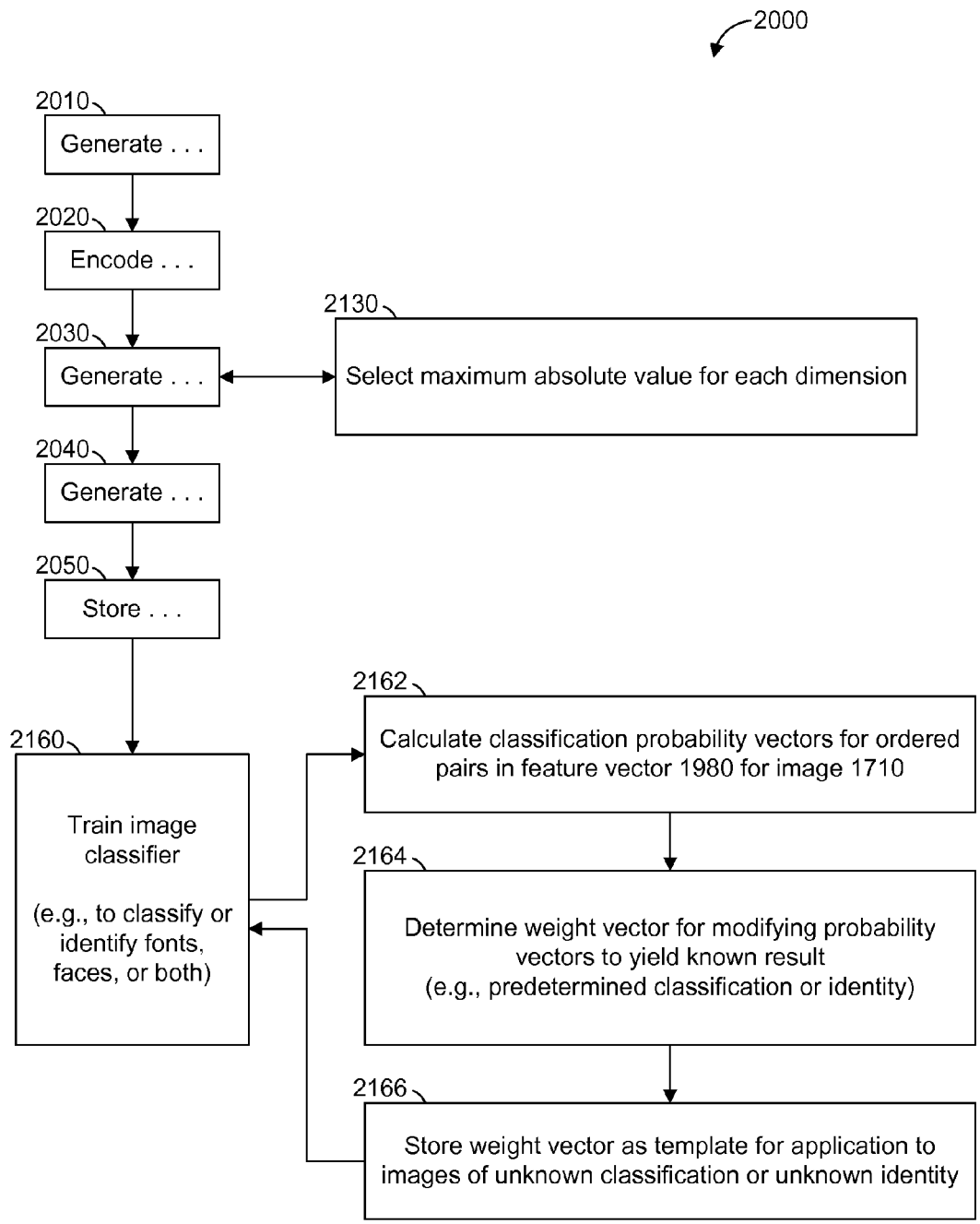
Figure 22:
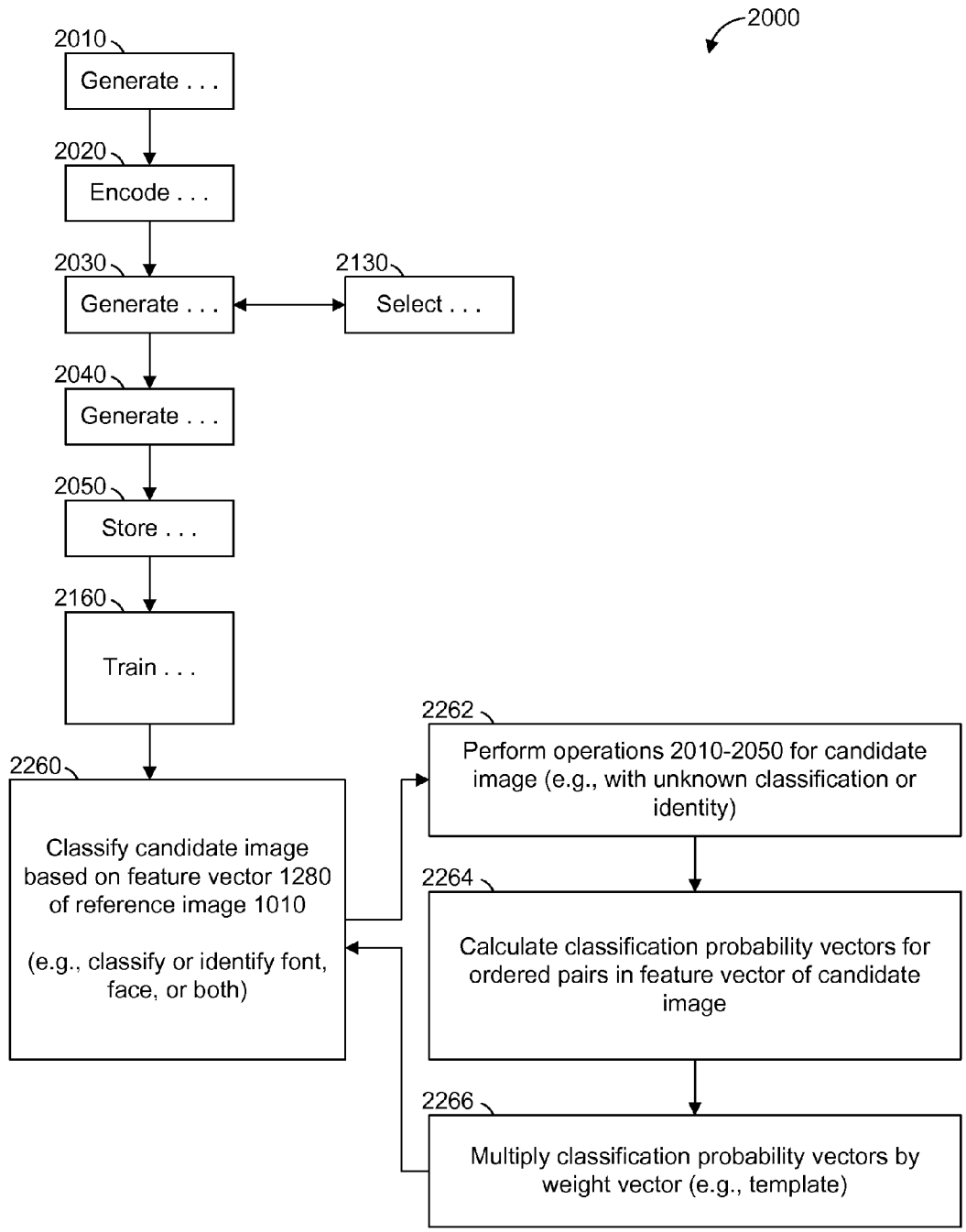

FIGS. 20-22 are flowcharts illustrating operations of the recognition machine 110 in performing a method 2000 of processing the image 1710, according to some example embodiments. Operations in the method 2000 may be performed using modules described above with respect to FIG. 2. As shown in FIG. 20, the method 2000 includes operations 2010, 2020, 2030, 2040, and 2050.

Prior to operation 2010, the image access module 210 of the recognition machine 110 may access the image 1710 from the database 115. As a preprocessing operation, the feature vector module 220 may determine the pixel blocks (e.g., pixel blocks 1711-1715), for example, by dividing the image 1710 into overlapping or non-overlapping pixel blocks. In some example embodiments, this preprocessing operation is included as part (e.g., a precursor task, a subroutine, or a portion) of operation 2010.

In operation 2010, the feature vector module 220 of the recognition machine 110 generates the first set 1720 of local feature vectors (e.g., local feature vectors 1721 and 1723). An example is discussed above with respect to FIG. 17. As noted above, this may be performed by executing a mathematical transformation on each of the pixel blocks (e.g., pixel blocks 1711-1715) of the image 1710. For example, the mathematical transformation may generate the local feature vector 1721 from pixel values of the pixel block 1711, and a mathematical transformation may generate the local feature vector 1723 from pixel values of the pixel block 1713.

In operation 2020, the feature vector module 220 encodes the first set 1720 of local feature vectors into a second set 1730 of encoded local feature vectors. An example is discussed above with respect to FIG. 17. In some example embodiments, this encoding operation reduces the number of dimensions represented from a first number of dimensions to a second number of dimensions that is less than the first number of dimensions. Accordingly, the ordered pairs in the first array 1850 of ordered pairs may be equal in number to the second number of dimensions, and the ordered pairs in the second array 1950 of ordered pairs may likewise be equal in number to the second number of dimensions.

In operation 2030, the feature vector module 220 generates the first array 1850 of ordered pairs (e.g., ordered pair 1879). An example is discussed above with respect to FIG. 18. As noted above, the value 1833 may be determined to be a characteristic value (e.g., maximum absolute value or maximum value) for the dimension 1840. Hence, the ordered pair 1879 (e.g., a first ordered pair) may pair the value 1833 from the encoded local feature vector 1733 with an index of that encoded local feature vector 1733, and this index may indicate the pixel block 1713 that corresponds to that same encoded local feature vector 1733.

In operation 2040, the feature vector module 220 generates the second array 1950 of ordered pairs (e.g., ordered pair 1979). An example is discussed above with respect to FIG. 19. As noted above, the ordered pair 1979 (e.g., a second ordered pair) may pair the value 1833 from the encoded local feature vector 1733 with the local feature vector 1723 itself (e.g., the corresponding local feature vector for the value 1833). According to certain example embodiments, operation 2040 may include identifying the local feature vector 1723 (e.g., a first vector) based on an index (e.g., "i") of its corresponding encoded local feature vector 1733 (e.g., a second vector).

In operation 2050, the vector storage module 230 of the recognition machine 110 stores the second array 1950 of ordered pairs as the feature vector 1980 of the image 1710. An example is discussed above with respect to FIG. 19. The feature vector 1980 may be used as a representative of the significant features depicted in the image 1710 in any algorithm for visual pattern recognition. As noted above, the feature vector 1980 may be stored in the database 115. In some example embodiments, the feature vector 1980 is later accessed (e.g., by the image access module 210) for use by the classifier trainer module 250 as a basis for training the image classifier module 240.

As shown in FIG. 21, the method 2000 may include one or more of operations 2130 and 2160. According to some example embodiments, operation 2130 may be performed as part (e.g., a precursor task, a subroutine, or a portion) of operation 2030, in which the feature vector module 220 generates the first array 1850 of ordered pairs. In operation 2130, the feature vector module 220 determines the characteristic value for the dimension 1840 by selecting the maximum absolute value for the dimension 1840 (e.g., a dimension in common) among the encoded local feature vectors (e.g., encoded local feature vector 1733) in the array 1830 of encoded local feature vectors. Thus, the value 1833 may be selected as the characteristic value for the dimension 1840.

According to certain example embodiments, the image 1710 may be a test image or a training image whose classification, categorization, or identity is already known (e.g., predetermined). Thus, the feature vector 1980 of the image 1710 may be used to train an image classifier (e.g., image classifier module 240). This training may be performed by the classifier trainer module 250 of the recognition machine 110.

Operation 2160 may be performed after operation 2050, in which the vector storage module 230 stores the feature vector 1980 of the image 1710. In operation 2160, the classifier trainer module 250 of the recognition machine 110 trains the image classifier module 240 (e.g., an image classifier, image categorization module, visual pattern recognizer, or any suitable combination thereof). For example, the image classifier module 240 may be trained to classify, categorize, or identify fonts, objects, faces of persons, scenes, or any suitable combination thereof, depicted within the image 1710. Moreover, the image classifier module 240 may be trained to classify the image 1710 based on the second array 1950 of ordered pairs (e.g., stored in the database 115 as the feature vector 1980 of the image 1710).

For example, the image 1710 may depict some text rendered in a font (e.g., Times New Roman, bold and italic). In such a situation, performance of operation 2160 may train the image classifier module 240 to classify the image 1710 by classifying the font in which the text depicted in the image 1710 is rendered. Furthermore, the classifying of this font may be based on the second array 1950 of ordered pairs (e.g., stored in the database 115 as the feature vector 1980 of the image 1710), which may be used to characterize the visual pattern of the font.

As another example, the image 1710 may depict a face of a person (e.g., a famous celebrity or a wanted criminal). In such a situation, performance of operation 2160 may train the image classifier module 240 to classify the image 1710 by classifying the face depicted in the image 1710 (e.g., by classifying a facial expression exhibited by the face, classifying a gender of the face, classifying an age of the face, or any suitable combination thereof). Furthermore, the classifying of this face may be based on the second array 1950 of ordered pairs (e.g., stored in the database 115 as the feature vector 1980 of the image 1710), which may be used to characterize the face as a visual pattern or characterize a visual pattern within the face (e.g., a visual pattern that includes a scar, a tattoo, makeup, or any suitable combination thereof).

According to various example embodiments, one or more of operations 2162, 2164, and 2166 may be performed as part (e.g., a precursor task, a subroutine, or a portion) of operation 2160. In operation 2162, the classifier trainer module 250 calculates classification probability vectors for the second array 1950 of ordered pairs. For example, for the ordered pair 1979 (e.g., the second ordered pair), a classification probability vector may be calculated, and this classification probability vector may define a distribution of probabilities that the local feature vector 1723 (e.g., as a member of the ordered pair 1979) represents certain features that characterize various classes (e.g., categories) of images. As such, the distribution of probabilities includes a probability of the local feature vector 1723 (e.g., the first vector)

representing a feature that characterizes a particular class of images (e.g., a particular style of font, such as italic or bold, or a particular gender of face).

For purposes of training the image classifier module 240, it may be helpful to modify the classification probability vectors calculated in operation 2162 (e.g., so that the modified classification probability vectors result in the known classification, categorization, or identity of the image 1710). This may be accomplished by determining a weight vector whose values (e.g., scalar values) may be applied as weights to the distribution of probabilities defined by each classification probability vector. Accordingly, in operation 2164, the classifier trainer module 250 determines such a weight vector (e.g., with the constraint that the weighted classification probability vectors produced the unknown result for the image 1710, when the weight vector is multiplied to each of the classification probability vectors).

With the effect of the weight vector, the modified (e.g., weighted) classification probability vectors define a modified distribution of probabilities, and the modified distribution of probabilities include a modified probability of the local feature vector 1723 (e.g., the first vector) representing a feature that characterizes the particular image class known for the image 1710. Moreover, by definition, the modified distribution of probabilities indicates that the local feature vector 1723 indeed does represent the feature that characterizes the known class of images for the image 1710. In other words, supposing that the image 1710 is known to belong to a particular class of images, the weight vector may be determined based on a constraint that the feature represented by the local feature vector 1723 characterizes this class of images to which the image 1710 belongs.

Once determined, the weight vector may be stored as a template (e.g., in a template or as the template itself). For example, the template may be stored in the database 115, and the template may be subsequently applicable to multiple classes of images (e.g., multiplied to classification probability vectors that are calculated for inside or outside the known classification for the image 1710). For example, the template may be applicable to images (e.g., candidate images) of unknown classification (e.g., unknown category) or unknown identity. Accordingly, in operation 2166, the classifier trainer module 250 may store the weight vector as such a template in the database 115.

As shown in FIG. 22, the method 2000 may include one or more of operations 2130, 2160, and 2260. Operation 2130 and 2160 are described above with respect to FIG. 21, and operation 2260 may be performed at a point in time after performance of operation 2160 (e.g., seconds, minutes, days, months, or years).

According to certain example embodiments, the image 1710 may be a reference image (e.g., a test image or a training image whose classification, categorization, or identity is already known). Supposing that the image classifier module 240 of the recognition machine 110 has been trained (e.g., by the classifier trainer module 250) based on the image 1710 (e.g., along with other reference images), the image classifier module 240 may be used to classify one or more candidate images of unknown classification, categorization, or identity. For example, the user 132 may use his device 130 to submit a candidate image (e.g., that depicts a visual pattern similar to that found in the image 1710) to the recognition machine 110 for visual pattern recognition (e.g., image classification, image categorization, or image identification). As discussed above with respect to FIG. 7, the training of the image classifier module 240 may be performed by the classifier trainer module 250 in operation 2160.

In operation 2260, image classifier module 240 classifies a candidate image (e.g., a further image, perhaps similar to the image 1710). For example, the image classifier module 240 may classify, categorize, or identify fonts, objects, faces of persons, scenes, or any suitable combination thereof, depicted within the candidate image. As noted above, the image classifier module 240 may be trained with the second array 1950 of ordered pairs (e.g., stored in the database 115 as the feature vector 1980 of the image 1710). Moreover, the image classifier module 240 may classify the candidate image based on a feature vector of the candidate image (e.g., a counterpart to the feature vector 1980 of the image 1710, generated in a manner similar to second array 1950 of ordered pairs).

For example, the candidate image may depict some text rendered in a font (e.g., Times New Roman, bold and italic). In such a situation, performance of operation 2260 may classify the candidate image by classifying the font in which the text depicted in the candidate image is rendered. Furthermore, the classifying of this font may be based on the feature vector of the candidate image (e.g., the candidate image's version of the feature vector 1980 for the image 1710, generated in a manner similar to second array 1950 of ordered pairs), which may be used to characterize the visual pattern of the font.

As another example, the candidate image may depict a face of a person (e.g., a famous celebrity or a wanted criminal). In such a situation, performance of operation 2260 may classify the candidate image by classifying the face depicted in the candidate image (e.g., by classifying a facial expression exhibited by the face, classifying a gender of the face, classifying an age of the face, or any suitable combination thereof). Furthermore, the classifying of this face may be based on the feature vector of the candidate image (e.g., the candidate image's counterpart to the feature vector 1980 of the image 1710, generated in a manner similar to second array 1950 of ordered pairs), which may be used to characterize the face as a visual pattern or characterize a visual pattern within the face (e.g., a visual pattern that includes a scar, a tattoo, makeup, or any suitable combination thereof).

According to various example embodiments, one or more of operations 2262, 2264, and 2266 may be performed as part (e.g., a precursor task, a subroutine, or a portion) of operation 2260. In operation 2262, the image classifier module 240 initiates performance of operations 2010-2050 for the candidate image (e.g., instead of the image 1710). Thus, the recognition machine 110 may generate a feature vector for the candidate image and store this feature vector in the database 115.

In operation 2264, the image classifier module 240 calculates classification probability vectors for the feature vector of the candidate image. This may be performed in a manner similar to that described above with respect to FIG. 21 for operation 2162. For example, for each ordered pair in the feature vector of the candidate image, a classification probability vector may be calculated to define a distribution of probabilities that the corresponding local feature vector (e.g., as a member of the ordered pair) represents features that characterize various classes (e.g., categories) of images. As such, the distribution of probabilities includes a probability of the local feature vector 1723 (e.g., the first vector) representing a feature that characterizes a particular class of images (e.g., a particular style of font, such as italic or bold, or a particular gender of face).

In operation 2266, the weight vector (e.g., templates) determined in operation 2164 (e.g., as discussed above with respect to FIG. 21) is applied by the image classifier module 240 to the classification probability vectors that were calculated in operation 2264 for the feature vector of the candidate image. For example, the image classifier module 240 may access the weight vector from the database 115 and multiply the classification probability vectors by the weight vector. With the effect of the weight vector, the modified (e.g., weighted) classification probability vectors for the candidate image define a modified distribution of probabilities that include a modified probability of a local feature vector of the candidate image representing a feature that characterizes a particular image class. As a result, the image classifier module 240 may cause (e.g., utilize, initiate, or execute) the trained image classifier module 240 to probabilistically determine a classification, categorization, or identity of the candidate image.

Regarding further details of LFE, an image classification machine (e.g., the recognition machine 110, which may be configured by one or more software modules to perform image classification) may classify a generic image by implementing a pipeline of first encoding local image descriptors (e.g., scale-invariant feature transform (SIFT) descriptors, local binary pattern (LBP) descriptors, kernel descriptors, or any suitable combination thereof) into sparse codes, and then pooling the sparse codes into a fixed-length image feature representation. With each image represented as a collection of local image descriptors $\{x_i\}_{i=1}^n$ with $x_i \in \Re^d$, the first coding step encodes each local descriptor into some code (e.g., a sparse code), $$y_i = f(x_i, T), \tag{B1}$$

where $T=[t_1; t_2, \ldots, t_K]$ denotes a template model or codebook of size K and $x_i \in \Re^d$, $f$ is the encoding function (e.g., vector quantization, soft assignment, locality-constrained linear coding (LLC), or sparse coding), and $y_i \in \Re^K$ is the code for $x_i$. Then the pooling step obtains the final image representation by $$z = g(\{y_i\}_{i=1}^n), \tag{B2}$$

where g is a pooling function that computes some statistics from each dimension of the set of vectors $\{y_i\}_{i=1}^n$ (e.g., average pooling or max pooling), and $z \in \Re^K$ is the pooled feature vector that may later be fed into a classifier.

While the above feature extraction pipeline may be effective at distinguishing different categories of objects, it may be insufficient to capture the subtle differences within an object category for fine-grained recognition (e.g., letter endings or other fine details that characterize various typefaces and fonts for text). According to example embodiments of the recognition machine 110, the above feature extraction pipeline may be extended by embedding local features into the pooling vector to preserve the fine-grained details (e.g., details of local letter parts in text). Specifically, using max pooling in Equation (B2), the recognition machine 110 not only pools the maximum sparse coefficients, but also records the indices of these max pooling coefficients:

$$\{z, e\} = \max(\{y_i\}_{i=1}^n), \tag{B3}$$

where z contains the max coefficients pooled from each dimension of the set $\{y_i\}_{i=1}^n$ and e is its index vector. Denoting $e_k = e(k)$ and $z_k = z(k)$, it can be seen that $z_k = y_{e_k}(k)$. Instead of using the max pooling coefficients as the final image feature representation, the pooling coefficients may be obtained together with the local descriptor that corresponds with each of them $\{z_k, x_{e_k}\}_{k=1}^K$. The final feature representation may be constructed by concatenating these local descriptors weighted by their pooling coefficients:

$$f = [z_1 x_{e_1}; z_2 x_{e_2}; \ldots; z_K x_{e_K}]. \tag{B4}$$

The max pooling procedure may introduce a competing process for all the local descriptors to match templates. Each pooling coefficient $z_k$ measures the response significance of $x_{e_k}$ with respect to template $t_k$, which is effective at categorizing coarse object shapes, while the pooled local descriptor $x_{e_k}$ preserves the local part details that are discriminative for classifying subtle fine-grained differences when the pooling coefficients are similar. Therefore, the feature representation in Equation (B4) can capture both coarse level object appearance changes and subtle object part changes. This feature representation may be called "local feature embedding" or "LFE."

Local feature embedding may embed the local descriptors from max pooling into a much higher dimensional space of $\Re^{Kd}$. For instance, if we use 59-dimensional LBP descriptors and a codebook size of 2048, the dimension of $f$ without using spatial pyramid matching (SPM) is already 120,832. Although embedding the image into higher dimensional spaces may be amicable to linear classifiers, training classifiers for very large-scale applications can be very time-consuming. Moreover, a potential drawback of training classifiers for large-scale classification is that, when images of new categories become available or when new images are added to existing categories, the retraining of new classifiers may involve a very high computational cost. Accordingly, the recognition machine 110 may utilize a new large-scale classification algorithm based on local feature metric learning and template selection, which can be readily generalized to new classes and new data at very little computational cost. For this purpose, the LFE feature in Equation (B4) may be modified into a local feature set representation:

$$f = \{(z_k, x_{e_k})\}_{k=1}^K. \tag{B5}$$

In a large-scale visual font recognition task, the dataset may be open-ended. For example, new font categories may appear over time and new data samples could be added to the existing categories. It may be important for a practical classification algorithm to be able to generalize to new classes and new data at very little cost. Nearest class mean (NCM), together with metric learning, may be used for certain large-scale classification tasks in which each class is represented by a mean feature vector that is efficient to compute. The recognition machine 110 may use NCM based on pooled local features to form a set of weak classifiers. Furthermore, a max-margin template selection scheme may be implemented to combine these weak classifiers for the final classification, categorization, or identification of a visual pattern within an image.

Supposing that the LFE feature $f = \{(z_k, x_{e_k})\}_{k=1}^K$ for each image is known (e.g., given or predetermined), a recognition system may generate (e.g., determine or calculate) a Mahalanobis distance metric for each pooled local feature space, under which an NCM classifier may be formulated using multi-class logistic regression, where the probability for a class c given a pooled local feature $x_{e_k}$ is defined by $$p(c \mid x_{e_k}) = \frac{\exp\left(-\|\mu_k^c - x_{e_k}\|_{W_k}^2\right)}{\sum_{c'=1}^{C} \exp\left(-\|\mu_k^{c'} - x_{e_k}\|_{W_k}^2\right)}, \quad (B6)$$

where $\mu_k^c$ is the class mean vector for the k-th pooled local features in class c, and $$\|\mu_k^c - x_{e_k}\|_{W_k}^2 = (\mu_k^c - x_{e_k})^T W_k^T W_k (\mu_k^c - x_{e_k}). \quad (B7)$$

Denoting $\Sigma_k^{-1} = W_k^T W_k$, it can be seen that the k-th pooled feature space (or its projected subspace) may be modeled as a Gaussian distribution with an inverse covariance matrix $\Sigma_k^{-1}$.

A metric learning method called within-class covariance normalization (WCCN) may be used to learn the metric $W_k$ for the k-th pooled feature space. First, interpreting $z_k$ as the probabilistic response of $x_{e_k}$ to template $t_k$, the class mean vector $\mu_k^c$ may be computed as $$\mu_k^c = \frac{1}{Z^c} \sum_{i \in I_c} z_k^i x_{e_k}^i, \quad (B8)$$

where i is the index for the i-th training image with LFE feature $f^i = \{z_k^i, x_{e_k}^i\}_{k=1}^K$, $I_c$ denotes the sample index set for class c, and $Z^c = \sum_{i \in I_c} z_k^i$ is a normalization factor. Then, the expected within-class covariance matrix over all classes may be computed as $\Sigma_k$:

$$\sum_k = E\left[\sum_{c'k}\right] \approx \sum_{c'=1}^{C} p(c') \sum_k^{c'}, \quad (B9)$$

where $$p(c') = \frac{\sum_{i \in I_c} z_k^i}{\sum_i z_k^i}, \quad (B10)$$

is the empirical probability of class c', and $\Sigma_k^{c'}$ is the within-class covariance for class c' defined as $$\sum_k^{c'} \approx \frac{1}{Z^{c'}} \sum_{i \in I_{c'}} z_k^i (x_{e_k}^i - \mu_k^{c'})(x_{e_k}^i - \mu_k^{c'})^T, \quad (B11)$$

with $Z^{c'} = \sum_{i \in I_{c'}} z_k^i$. In practice, empirical estimates of $\Sigma_k$ may be noisy. Therefore, a certain amount of smoothness may be added by shrinking $\Sigma_k$ towards the scalar covariance as $$\hat{\Sigma}_k = (1-\alpha)\Sigma_k + \alpha \sigma^2 I, \alpha \in [0,1), \quad (B12)$$

where $\hat{\Sigma}_k$ represents a smoothed version of the empirical expected within-class covariance matrix, I is the identity matrix, and $\sigma^2$ can take the value of trace $(\Sigma_k)$. An example system may therefore compute the eigen-decomposition for each $\hat{\Sigma}_k = U_k D_k U_k^T$, where $U_k$ is orthonormal and $D_k$ is a diagonal matrix of positive eigenvalues. Then the feature projection matrix $W_k$ in Equation (B6) may be defined as $$W_k = D_k^{-1/2} U_k^T, \quad (B13)$$

which basically spheres the data based on the common covariance matrix. In the transformed space, NCM may be used as the classifier, which may lay the foundation for the multi-class logistic regression in Equation (B6).

To further enhance the discriminative power of $W_k$, the projection components with high within-class variability may be depressed, for example, by discarding the first few largest eigen-values in $D_k$, which corresponds to the subspace where the feature similarity and label similarity are most out of sync (e.g., with large eigenvalues corresponding to large within-class variance). In such a case, the solution of WCCN may be interpreted as the result of discriminative subspace learning.

After obtaining the metric for each pooled local feature space, and assuming the templates in T are independent, the recognition machine 110 may evaluate the posterior of a class c for the input image feature representation $f$ by combining the outputs of Equation (B6) using a log-linear model:

$$p(c \mid f) = \frac{1}{H} \exp\left(a + \sum_a w_k \log p(c \mid x_{e_k})\right) \quad (B14)$$

where H is a normalization factor to ensure the integrity of $p(c|f)$, $w_k$ weights the contribution of each pooled local feature to the final classification, and a is a small constant offset. Here, the weight vector $w=[w_1, w_2, \ldots, w_K]^T$, which may be shared by all classes, may act to select the most discriminative templates from the template model $T=\{t_K\}_{k=1}^K$ for the given classification task. Then, the classification task for $f$ is simply to choose the class with the largest posterior:

$$c^* = \underset{c'}{\operatorname{argmax}} \, p(c' \mid f). \quad (B15)$$

Alternatively, the recognition machine 110 may be configured to treat the multi-class logistic regression for each pooled local feature as a weak classifier, and then linearly combine them to obtain a strong classifier:

$$s(c \mid f) = \sum_{k=1}^{K} w_k p(c \mid x_{e_k}). \quad (B16)$$

In this way, the recognition machine 110 may avoid the numerical instability and data scale problem of logarithm in Equation (B14). The score function $s(c|f)$ need not have a probabilistic interpretation anymore, but the classification task may again be to find the class with the largest score output. In practice, this formulation may work slightly better than a log-linear model, and this linear model may be implemented in the recognition machine 110.

Given a set of training samples $\{f^i, c^i\}_{i=1}^N$, where $c^i \in \{1, \ldots, C\}$ is the class label for the i-th data sample, it is possible to find the optimal weight vector w such that the following constraints are best satisfied:

$$s(c^i \mid f^i) > s(c' \mid f^i), \forall i, c' \neq c^i, \quad (B17)$$

which translates to:

$$\sum_{k=1}^{K} w_k \left( p(c^i | x_{e_k}^i) - p(c' | x_{e_k}^i) \right) > 0, \forall i, c^i \neq c^i. \quad \text{(B18)}$$

In order to learn w, it may be helpful to define a cost function using a multi-class hinge loss function to penalize violations of the above constraints:

$$L(f^i, c^i; w) \sum_{c' \neq c^i} \max\{0, -\gamma^i(c') + 1\}, \quad \text{(B19)}$$

where $$\gamma^i(c') = \sum_{k=1}^{K} w_k \left( p(c^i | x_{e_i}^i) - p(c' | x_{e_k}^i) \right). \quad \text{(B20)}$$

Then w may be obtained by solving the following optimization:

$$\min_{w} \lambda \sum_{i=1}^{N} L(f^i, c^i; w) + \rho(w), \quad \text{(B21)}$$

where $\rho(w)$ regularizes the model complexity. Note that when $\rho(w) = \|w\|_2^2$ Equation (B21) is a classical one-class support vector machine (SVM) formulation. To see this, denoting $$p^i(c) = [p(c|x_{e_1}^i); p(c|x_{e_2}^i); \ldots ; p(c|x_{e_K}^i)], \quad \text{(B22)}$$

and $q^i(c') = p^i(c') - p^i(c)$, Equation (B19) may translate to $$L(f^i, c^i; w) = \sum_{c' \neq c^i} \max\{0, -w^T q^i(c') \cdot 1 + 1\}, \quad \text{(B23)}$$

where $q^i(c')$ may be regarded as feature vectors with only positive label +1. Therefore, the optimization in Equation (B21) is the classical SVM formulation with only positive class and thus can be solved by an SVM package. The regularization term $\rho(w)$ may also take the form of where the $l^1$-norm promotes sparsity for template selection, which may have better generalization behavior when the size K of the template model T is very large.

After the WCCN metric is obtained for all pooled local feature spaces and the template weights based on LFE, the classification task for a given $f$ may be straightforward: first compute the local feature posteriors using Equation (6), combine them with the learned weights w, and then determine (e.g., predict, infer, or estimate) the class label by selecting the largest score output $c^* = \max_c s(c'|f)$. When new data or font classes are added to the database, it is sufficient to calculate the new class mean vectors and estimate the within-class covariances to update the WCCN metric incrementally. Because the template model is universally shared by all classes, the template weights do not need to be retrained. Therefore, the above-described algorithm (e.g., as implemented in the recognition machine 110) can readily adapt to new data or new classes at little added computational cost.

According to various example embodiments, one or more of the methodologies described herein may facilitate generation of a hierarchy of visual pattern clusters, as well as facilitate visual pattern recognition in an image. As noted above, generation and use of such a hierarchy of visual pattern clusters may enable a system to omit unrelated classifiers and execute only those classifiers with at least a threshold probability of actually classifying a candidate visual pattern. Thus, in situations with large numbers of visual patterns, one or more of the methodologies described herein may enable efficient and scalable automated visual pattern recognition. Moreover, one or more of the methodologies described herein may facilitate classification, categorization, or identification of a visual pattern depicted within an image, such as a font used for rendering text or a face that appears in the image. Hence, one or more the methodologies described herein may facilitate font recognition, facial recognition, facial analysis, or any suitable combination thereof.

When these effects are considered in aggregate, one or more of the methodologies described herein may obviate a need for certain efforts or resources that otherwise would be involved in recognition of visual patterns in images. Efforts expended by a user in recognizing a visual pattern that appears within an image may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

In the discussion above regarding the method 2000, examples are provided in which a particular local feature type (e.g., scale-invariant feature transform (SIFT) descriptors, local binary pattern (LBP) descriptors, kernel descriptors, and so on) may be used to generate the local feature vectors 1723 and subsequent data representations resulting in the feature vector 1980 or representation for an image 1710. In other examples, more than one type of local feature may be employed to represent a single image for classification purposes.

Figure 23:
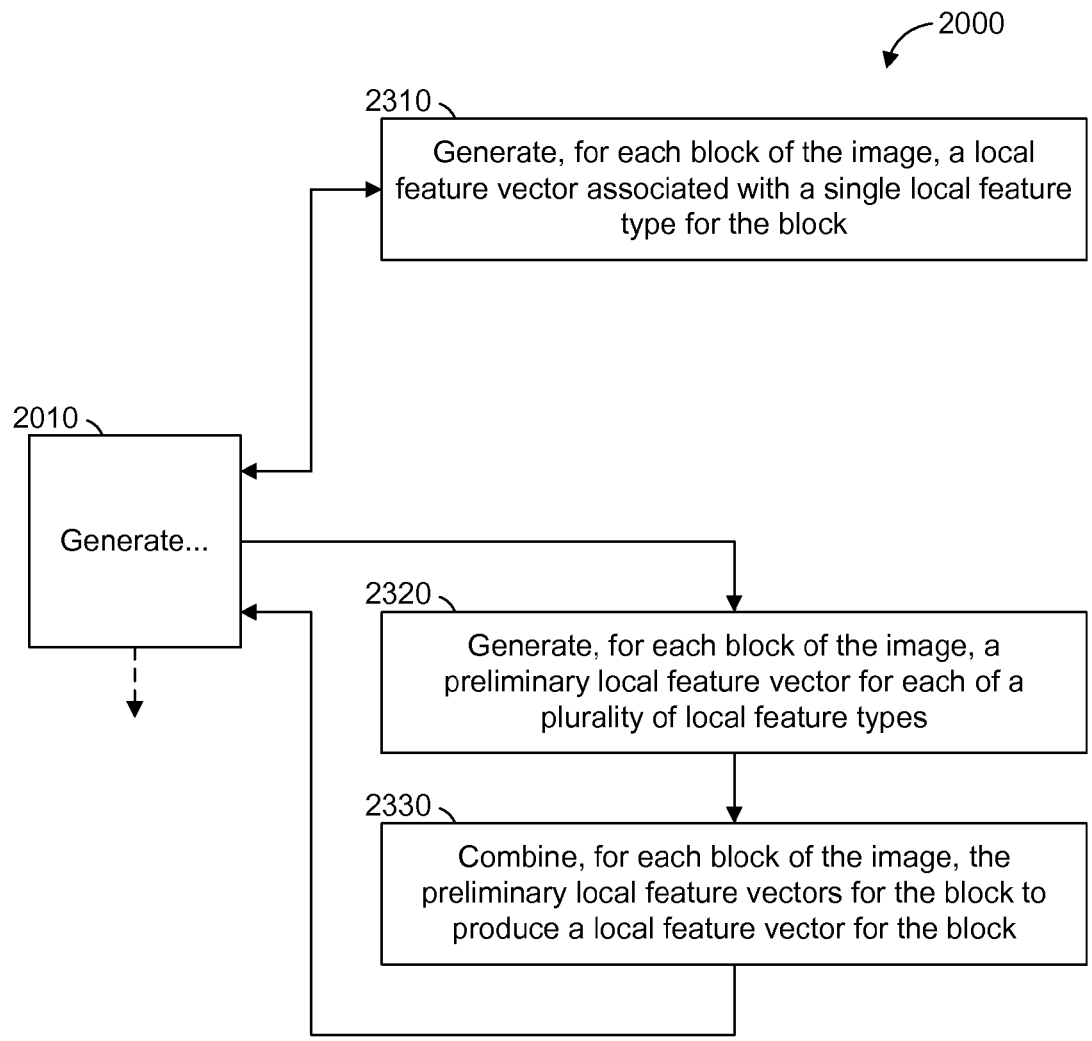
FIGS. 23-25 are flowcharts illustrating operations of the recognition machine in performing methods of employing multiple local feature types to classify images, according to some example embodiments.
Figure 24:
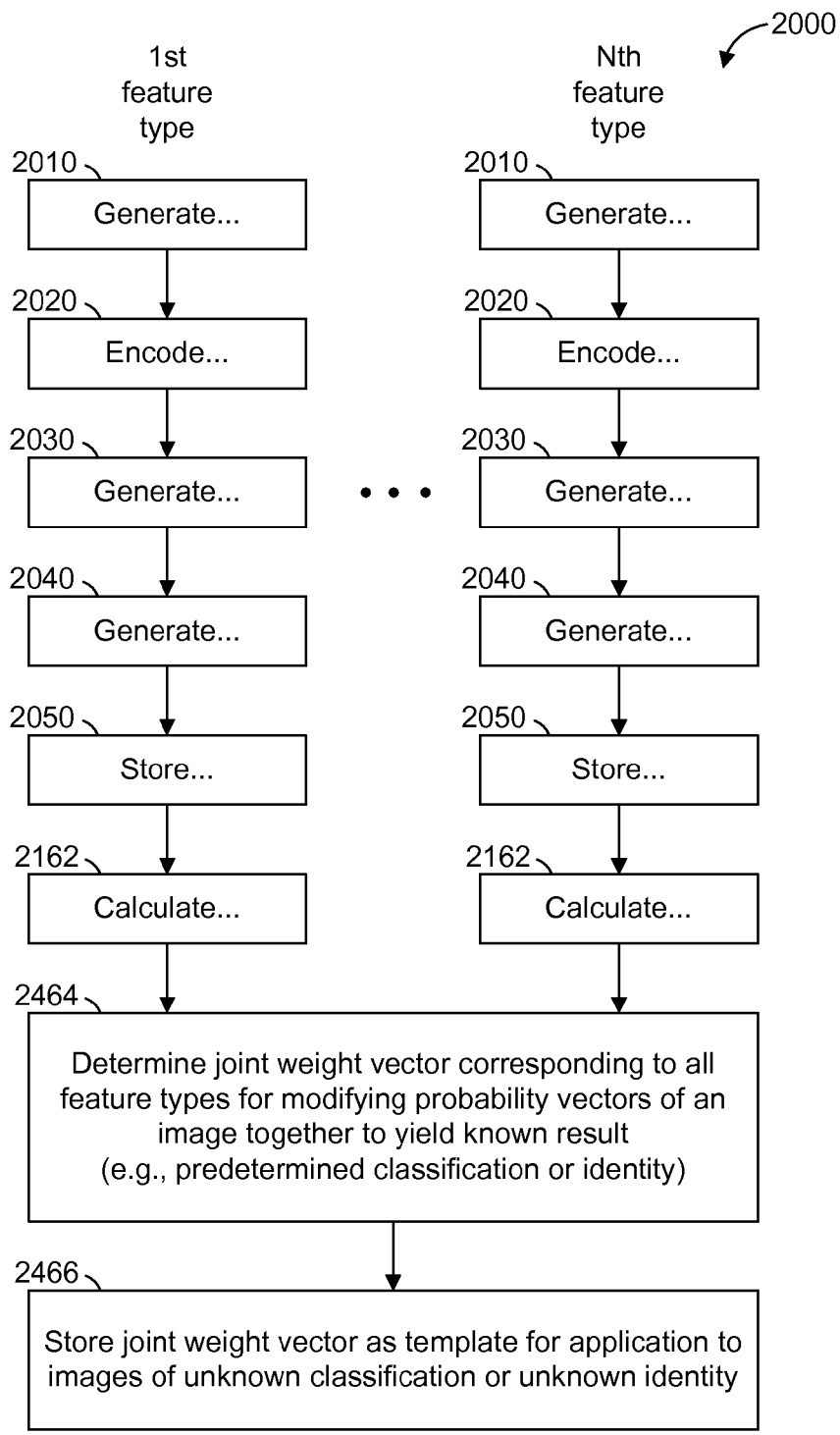
Figure 25:
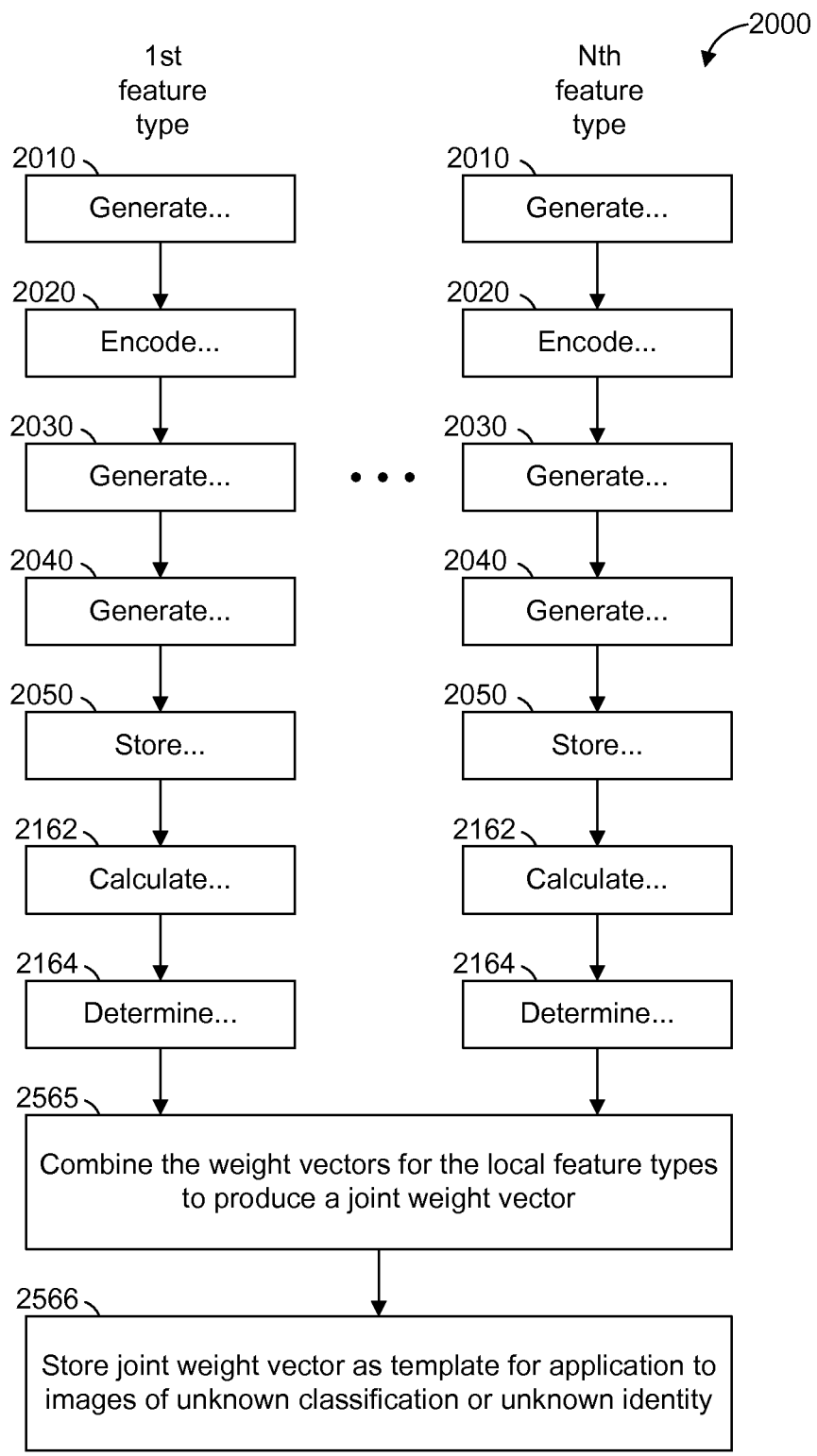

FIGS. 23-25 are flowcharts illustrating operations of the recognition machine 110 in performing methods of employing one or more local feature types to classify images, according to some example embodiments. In FIG. 23, operation 2010 of method 2000, which generates the set of local feature vectors for the pixel blocks of an image, may include operation 2310, or operations 2320 and/or 2330, in some examples. In operation 2310, a local feature vector 1723 representing a single local feature type may be generated for each pixel block 1711 of an image 1710. Such use of a single local feature type is described above in conjunction with FIG. 17.

However, in some implementations, the use of two or more local feature types for each pixel block 1711 of an image 1710 may allow the resulting feature vector 1980 to represent more salient features of the image 1710. For example, SIFT is generally thought to describe object shapes more accurately than many other local feature types, while LBP may better preserve textural information. Accordingly, the use of both SIFT and LBP may thus facilitate a representation of both local feature types in one or more feature vectors 1980 representing the image 1710 in an efficient manner. In other examples, any number of local features may be combined to represent the image 1710.

In one example, exemplified by operations 2320 and 2330 of FIG. 23, which may be included in operation 2010 of FIG.

20, a preliminary local feature vector for each of a plurality of local feature types may be generated for each block 1711 of the image 1710. For example, if SIFT and LBP are both utilized, a preliminary local feature vector similar to the local feature vector 1723 for SIFT and for LBP may be generated for each pixel block 1711 of the image 1710. Accordingly, a preliminary local feature vector for SIFT and a separate preliminary local feature vector for LBP may be generated for each pixel block 1711. In operation 2330, the preliminary local feature vectors for the different local feature types for each pixel block 1711 of the image 1710 may then be combined in some fashion to generate a new, single local feature vector (similar to local feature vector 1723) for each pixel block 1711. For example, for a particular pixel block 1711, the preliminary local feature vector for LBP and the preliminary local feature for SIFT associated with that pixel block 1711 may be combined to form a single local feature vector for that pixel block 1711. In one example, the preliminary local feature vectors for a pixel block 1711 may be concatenated to form the resulting local feature vector. In other implementations, the preliminary local feature vectors may be processed (e.g., shortened or otherwise reduced) prior to, and/or after, their combining. Further, the preliminary local feature vectors may be combined in other ways aside from concatenation, such as, for example, linear combination.

In another embodiment, each of the separate local feature vectors for each local feature type may be processed individually to some degree prior to being combined. FIG. 24 provides an example in which a local feature vector for each local feature vector type being utilized is generated for each pixel block 1711, illustrated by way of a separate operation 2010 for each of N local feature types. In an example, each local feature vector 1723 for a pixel block 1711 may then be processed by way of operations 2020, 2030, 2040, and 2050, as discussed earlier in conjunction with FIG. 20, resulting in a separate feature vector 1980 for each local feature type for the same image 1710. Further, each feature vector 1980 may then be processed, such as by way of operation 2162, to calculate a classification probability vector for each ordered pair 1979 in the feature vectors 1980.

To effectively combine or "fuse" the multiple local feature types in this example, a joint weight vector may be determined that corresponds to all local feature types by, for example, modifying the classification probability vectors of the images 1710 together to yield a known classification for each of the images 1710 (operation 2464). In operation 2466, the joint weight vector may be stored as a template to be applied to images 1710 of unknown classification or identity.

More specifically regarding the operations of FIG. 24, suppose we have P different local feature types. The LFE for an image may then be represented as $$f = \{\{(z_{k,1}, x_{e_k,1})\}_{k=1}^K, \ldots, \{(z_{k,P}, x_{e_k,P})\}_{k=1}^K\}. \quad (C1)$$

The recognition machine 110 may be configured to treat the multi-class logistic regression for each type of pooled local feature as a weak classifier, and then linearly combine them to obtain a strong classifier:

$$s(c|f) = \sum_{p=1}^P \sum_{k=1}^K w_{k,p} p(c|x_{e_k,p}). \quad (C2)$$

Given a set of training samples $\{f^i, c^i\}_{i=1}^N$, where $c^i \in \{1, \ldots, C\}$ is the class label for the i-th data sample, it is possible to find the optimal weight vector w such that the following constraints are best satisfied:

$$s(c^i|f^i) > s(c'|f^i), \forall i, c' \neq c^i, \quad (C3)$$

as described above, which translates to:

$$\sum_{p=1}^P \sum_{k=1}^K w_{k,p}(p(c^i|x_{e_k,p}^i) - p(c'|x_{e_k,p}^i)) > 0, \forall i, c' \neq c^i. \quad (C4)$$

In order to learn w, a cost function may be defined using a multi-class hinge loss function to penalize violations of the above constraints:

$$L(f^i, c^i; w) \sum_{c' \neq c^i} \max\{0, -\gamma^i(c') + 1\}, \quad (C5)$$

where $$\gamma^i(c') = \sum_{p=1}^P \sum_{k=1}^K w_{k,p}(p(c^i|x_{e_k,p}^i) - p(c'|x_{e_k,p}^i)). \quad (C6)$$

Then w may be obtained by solving the following optimization:

$$\min_w \lambda \sum_{i=1}^N L(f^i, c^i; w) + \rho(w), \quad (C7)$$

where $\rho(w)$ regularizes the model complexity. When $\rho(w) = \|w\|_2^2$, Equation (C7) is a classical one-class support vector machine (SVM) formulation. To see this, denoting $$p^i(c) = \begin{bmatrix} p(c|x_{e_1,1}^i); p(c|x_{e_2,1}^i); \ldots; p(c|x_{e_K,1}^i); \ldots; \\ p(c|x_{e_1,P}^i); p(c|x_{e_2,P}^i); \ldots; p(c|x_{e_K,P}^i) \end{bmatrix}, \quad (C8)$$

and $q^i(c') = p^i(c') - p^i(c')$, Equation (C5) may translate to $$L(f^i, c^i; w) = \sum_{c' \neq c^i} \max\{0, -w^T q^i(c') \cdot 1 + 1\}, \quad (C9)$$

where $q^i(c')$ may be regarded as feature vectors with only positive label +1. Therefore, the optimization in Equation (C7) is the classical SVM formulation with only positive class and thus can be solved by an SVM package. The regularization term $\rho(w)$ may also take the form of where the $\|w\|_l$, where the $l^1$-norm promotes sparsity for template selection, which may have better generalization behavior when the size K of the template model T is very large.

In another embodiment, FIG. 25 displays a method in which, similar to the method of FIG. 24, a local feature vector for each local feature type being utilized is generated for each pixel block 1711, illustrated by way of a separate operation 2010 for each local feature type. In an example, each local feature vector 1723 for a pixel block 1711 may then be processed by way of operations 2020, 2030, 2040, and 2050, as discussed earlier in conjunction with FIG. 20, resulting in a separate feature vector 1980 for each local feature type for the image 1710. Further, each feature vector 1980 may then be processed, such as by way of operation 2162 (FIG. 21), to calculate a classification probability vector for each ordered pair 1979 in the feature vector 1980, and by way of operation 2164 (also FIG. 21), in which a separate weight vector is determined to modify each classification probability vector for the feature vectors 1980 associated with a particular local feature type to yield a known result for the images 1710. In operation 2565, the weight vectors for the images 1710 may be combined to produce a joint weight vector for the images 1710. In some implementations, the weight vectors may be combined by way of linear combination to produce the joint weight vector. In operation 2566, the joint weight vector may be stored as a template to determine the classification of future images.

Each of the above implementations of FIGS. 23-25 involving the use of multiple local feature types may be applied to both hierarchical and nonhierarchical classification schemes, as discussed more fully above.

Figure 26:
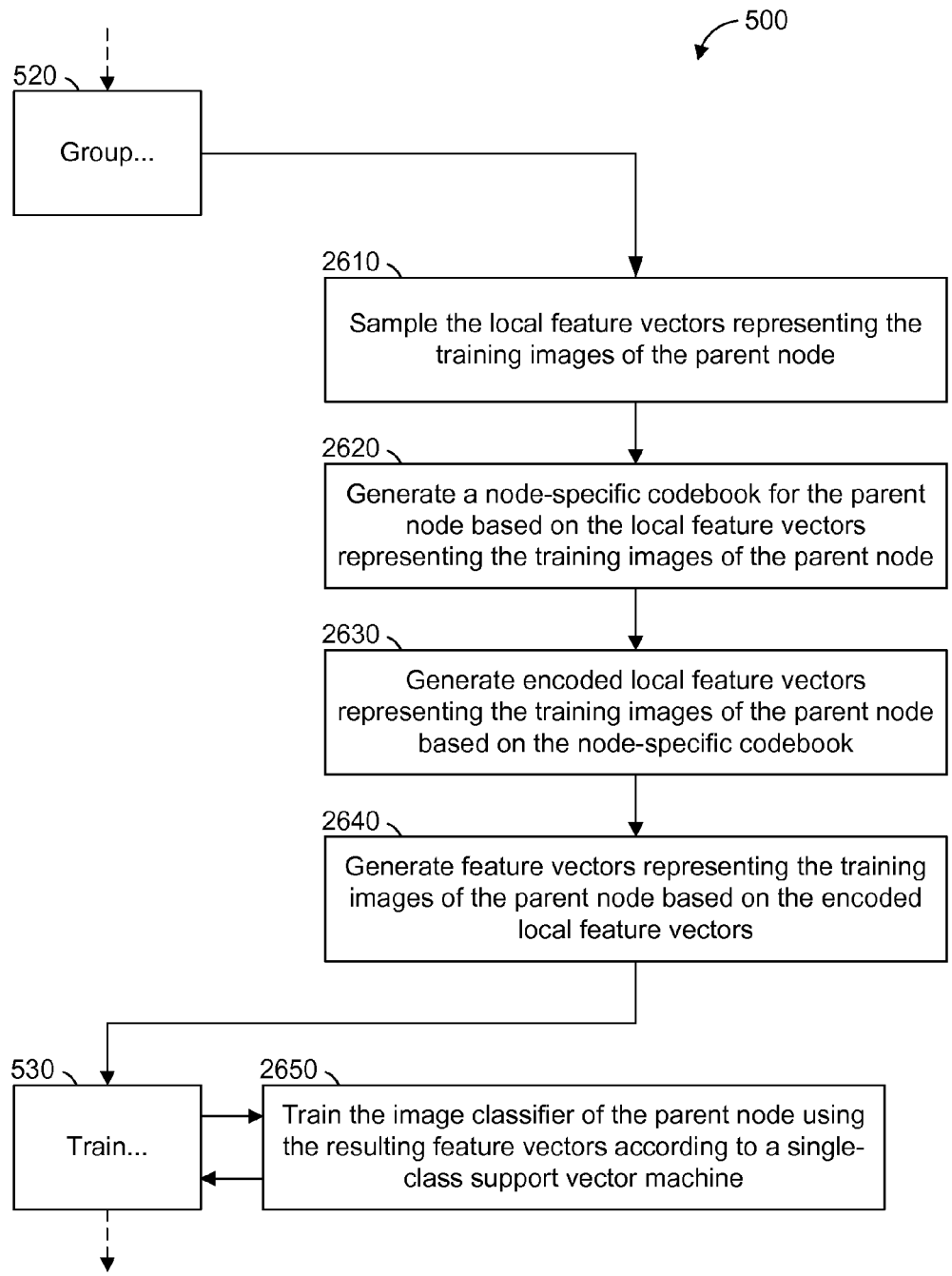
FIG. 26 is a flowchart illustrating operations of the recognition machine in performing a method of employing node-specific codebooks to train a hierarchy of visual class patterns.

In an embodiment applicable to hierarchical classification systems, FIG. 26 is a flowchart illustrating operations of the recognition machine 110 in performing a method of employing node-specific (or class-specific) codebooks to train a hierarchy of visual class patterns. Relative to method 500, described earlier in relation to FIG. 5, after the operation 520 of grouping multiple training images of a parent node into a plurality of child nodes by way of an image classifier of the parent node analyzing feature vectors (e.g., feature vector 1980 of FIG. 19) of the images, operations 2610, 2620, 2630, and/or 2640 may be employed to generate new feature vectors for the training images based on a codebook that is generated specifically for the parent node.

For example, in operation 2610, local features (e.g., local feature vectors 1723 of FIG. 17) representing the training images of a parent node i may be sampled. In one example, a minority of the training images may be sampled, while in other implementations, a majority, or even substantially all, of the training images may be utilized to determine local features most closely associated with the parent node i. Further, presuming the parent node i is associated with $N_i$ child classifications, training images from each of the $N_i$ classifications may be sampled. In some examples, the local features may be extracted from local feature vectors (e.g., local feature vectors 1723 of FIG. 17), encoded local feature vectors (e.g., encoded local feature vectors 1733 of FIG. 17), or the feature vectors associated with each of the sampled images.

In operation 2620, a node-specific codebook $C_i$ (or, alternatively, a template model T) for the parent node i may then be generated based on the local features sampled from the training images of the parent node i. In at least some implementations, the node-specific codebook $C_i$ is a set of sparse codes employed specifically for the parent node i to encode the local features into encoded local feature vectors (e.g., encoded local feature vectors 1733 of FIG. 17). In one example, the node-specific codebook $C_i$ is generated such that significantly different local features represented in the local feature vectors are easily distinguished when encoded into the encoded local feature vectors via the node-specific codebook $C_i$.

Further, in operation 2630, new encoded local feature vectors for representing each of the training images of the parent node i may then be generated using the node-specific codebook $C_i$, similar to the method described above. In operation 2640, new feature vectors (e.g., feature vectors 1980 of FIG. 19) for each of the images 1710 may then be generated based on the new encoded local feature vectors, also as discussed earlier. Performing operations 2610, 2620, 2630, and 2640 for each parent node of a hierarchical classification scheme may thus result in a unique codebook $C_i$ for its corresponding parent node i.

In conjunction with operation 530 of FIG. 5, the image classifier of each parent node i may then be trained (or retrained) in operation 2650 using the new feature vectors (e.g., feature vector 1980) of each training image 1710. In some examples, the training of the image classifier for each parent node may be accomplished separately according to a one-class (e.g., nonhierarchical) support vector machine (SVM), as described above. Accordingly, both the image classifier (e.g., weight vectors) and the codebook for each parent node of the classification hierarchy may be trained using this overall approach. In some implementations, the image classifier and/or the codebook for each parent node may be trained multiple times to increase their effectiveness in classifying candidate images.

Figure 27:
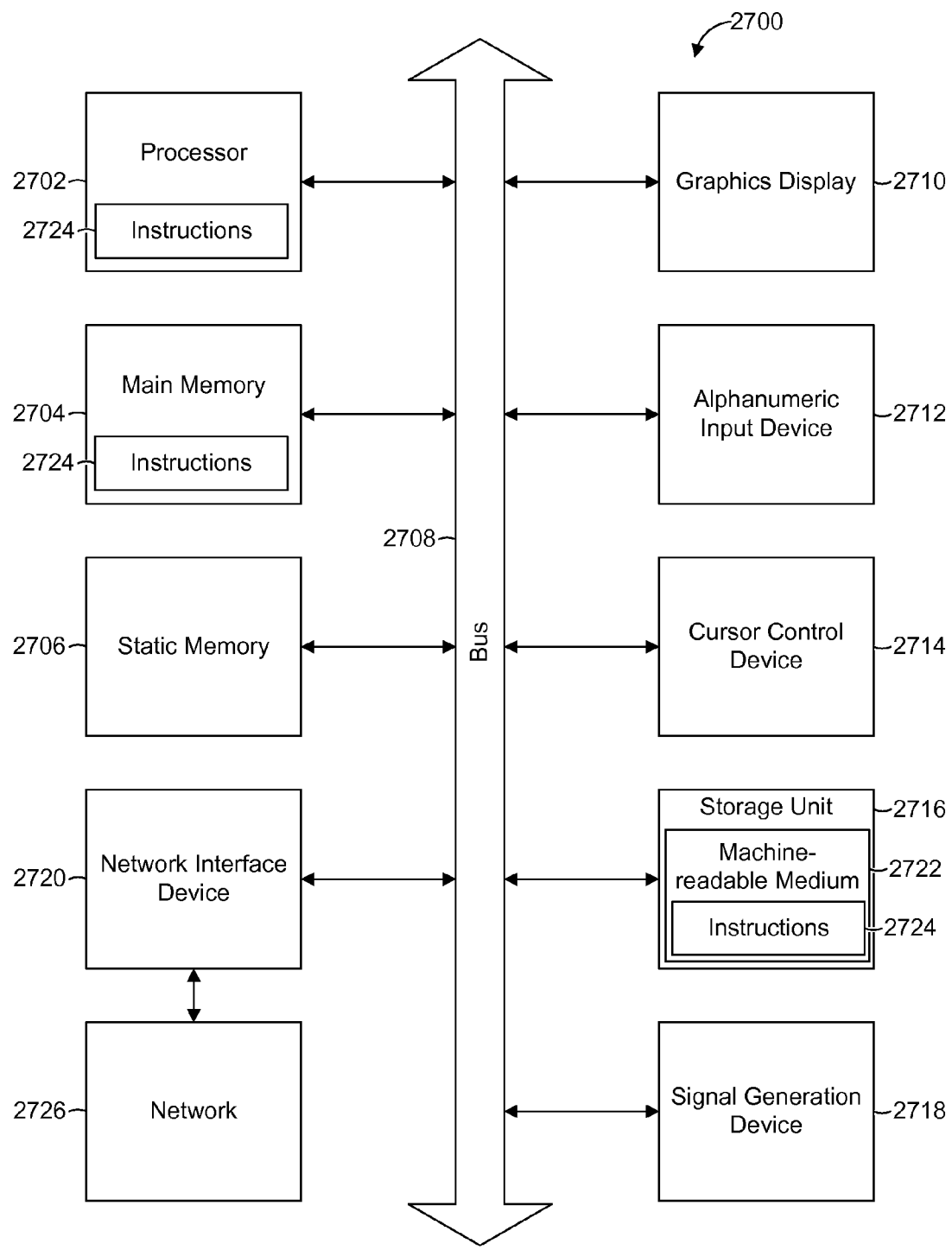
FIG. 27 is a block diagram illustrating components of a machine, according to some example embodiments, able to read instructions from a machine-readable medium and perform any one or more of the methodologies discussed herein.

FIG. 27 is a block diagram illustrating components of a machine 2700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 27 shows a diagrammatic representation of the machine 2700 in the example form of a computer system and within which instructions 2724 (e.g., software, a program, an application, an applet, an app, or other executable code) for causing the machine 2700 to perform any one or more of the methodologies discussed herein may be executed, in whole or in part. In alternative embodiments, the machine 2700 operates as a standalone device or may be connected (e.g., networked) to other machines. In a networked deployment, the machine 2700 may operate in the capacity of a server machine or a client machine in a server-client network environment, or as a peer machine in a distributed (e.g., peer-to-peer) network environment. The machine 2700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2724, sequentially or otherwise, that specify actions to be taken by that machine. Further, while only a single machine is illustrated, the term "machine" shall also be taken to include a collection of machines that individually or jointly execute the instructions 2724 to perform all or part of any one or more of the methodologies discussed herein.

The machine 2700 includes a processor 2702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2704, and a static memory 2706, which are configured to communicate with each other via a bus 2708. The processor 2702 may contain microcircuits that are configurable, temporarily or permanently, by some or all of the instructions 2724 such that the processor 2702 is configurable to perform any one or more of the methodologies described herein, in whole or in part. For example, a set of one or more microcircuits of the processor 2702 may be configurable to execute one or more modules (e.g., software modules) described herein.

The machine 2700 may further include a graphics display 2710 (e.g., a plasma display panel (PDP), a light emitting diode (LED) display, a liquid crystal display (LCD), a projector, or a cathode ray tube (CRT)). The machine 2700 may also include an alphanumeric input device 2712 (e.g., a keyboard), a cursor control device 2714 (e.g., a mouse, a touchpad, a trackball, a joystick, a motion sensor, or other pointing instrument), a storage unit 2716, a signal generation device 2718 (e.g., a speaker), and a network interface device 2720.

The storage unit 2716 includes a machine-readable medium 2722 (e.g., a tangible and non-transitory machine-readable storage medium) on which are stored the instructions 2724 embodying any one or more of the methodologies or functions described herein. The instructions 2724 may also reside, completely or at least partially, within the main memory 2704, within the processor 2702 (e.g., within the processor's cache memory), or both, during execution thereof by the machine 2700. Accordingly, the main memory 2704 and the processor 2702 may be considered as machine-readable media (e.g., tangible and non-transitory machine-readable media). The instructions 2724 may be transmitted or received over a network 2726 (e.g., network 190) via the network interface device 2720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 2700), such that the instructions, when executed by one or more processors of the machine (e.g., processor 2702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   at least one processor; and
   memory comprising instructions that, when executed by the at least one processor, cause the system to perform operations comprising:
      generating, for each of a plurality of reference visual patterns, at least one representation of the reference visual pattern based on a plurality of local feature types;
      generating at least one image classifier based on the at least one representation of each of the reference visual patterns;
      classifying each of the reference visual patterns into at least one of a plurality of visual pattern classifications using the at least one image classifier; and
      assigning a reference visual pattern of the plurality of reference visual patterns into at least two visual pattern classifications of the plurality of visual pattern classifications, where the assigned reference visual pattern is classified into any of the at least two visual pattern classifications of the plurality of visual pattern classifications the operations further comprising: classifying a plurality of candidate visual patterns based on the at least one image classifier; and
      wherein two or more image classifiers classify the plurality of candidate visual patterns into classes defined by a first set of parent nodes and at least a second set of child nodes; and
      wherein the child nodes include at least one auxiliary node for previously misclassified images or images properly concurrently classified in two or more nodes; and
      wherein the auxiliary node is for misclassified images, and the auxiliary node includes images drawn from mutually exclusive sibling nodes.

2. The system of claim 1, wherein:
   the plurality of visual pattern classifications are organized hierarchically.

3. The system of claim 1, wherein:
   the plurality of visual pattern classifications are organized nonhierarchically.

4. The system of claim 1, wherein:
   the plurality of local feature types comprises at least one of a group consisting of scale-invariant feature transform (SIFT) descriptors, local binary pattern (LBP) descriptors, and kernel descriptors.

5. The system of claim 1, wherein the generating of the at least one representation of the reference visual pattern comprises:
   generating, for each of a plurality of pixel blocks of the reference visual pattern, a local feature representation for each of the plurality of local feature types; and
   combining, for each of the plurality of pixel blocks of the reference visual pattern, the local feature representations for the plurality of local feature types to produce a second local feature representation for each of the plurality of pixel blocks of the reference visual pattern, wherein the generating of the at least one image classifier is based on the second local feature representation for each of the plurality of pixel blocks of the reference visual pattern.

6. The system of claim 5, wherein:
the combining of the local feature representations for the plurality of local feature types comprises concatenating the local feature representations for the plurality of local feature types to produce the second local feature representation.

7. The system of claim 1, wherein:
the generating of the at least one representation of the reference visual pattern comprises generating a representation of the reference visual pattern for each of the plurality of local feature types;
the generating of the at least one image classifier comprises generating a joint weight vector corresponding to the plurality of local feature types based on the feature representation for each of the plurality of local feature types; and
the generating of the at least one image classifier is based on the joint weight vector.

8. The system of claim 1, wherein:
the generating of the at least one representation of the reference visual pattern comprises generating a feature representation of the reference visual pattern for each of the plurality of local feature types; and
the generating of the at least one image classifier comprises:
generating a separate weight vector for each of the plurality of local feature types based on the feature representation for each of the plurality of local feature types; and
combining the separate weight vectors to produce a joint weight vector, wherein the generating of the at least one image classifier is based on the joint weight vector.

* * * * *

UNITED STATES PATENT AND TRADEMARK OFFICE
CERTIFICATE OF CORRECTION

PATENT NO.        : 9,524,449 B2                             Page 1 of 1
APPLICATION NO.   : 14/107191
DATED             : December 20, 2016
INVENTOR(S)       : Jianchao Yang et al.

It is certified that error appears in the above-identified patent and that said Letters Patent is hereby corrected as shown below:

In the Claims
Column 40, Line 20: remove "and" after the ";".
Column 40, Line 27: "classifications the operations further comprising classifying" should read --classifications; and-- and a new paragraph inserted thereafter, beginning --classifying--.
Column 40, Lines 29-30: replace ";" with a "," and remove "and.".
Column 40, Line 34: replace ";" with a "," and remove "and.".
Column 40, Line 38: replace ";" with a ",".
Column 41, Line 26: paragraph should be indented.
Column 41, Line 30: paragraph should be indented.
Column 41-42: columns should be equal.

Signed and Sealed this
Sixteenth Day of May, 2017

Michelle K. Lee
*Director of the United States Patent and Trademark Office*